United States Patent [19]

Lay

[11] 4,239,027

[45] Dec. 16, 1980

[54] ROTARY INTERNAL STAGE COMBUSTION ENGINE

[76] Inventor: Joachim E. Lay, 1749 Ridgewood, East Lansing, Mich. 48823

[21] Appl. No.: 54,034

[22] Filed: Jul. 2, 1979

[51] Int. Cl.³ .................. F02B 53/02; F02B 47/08
[52] U.S. Cl. .................. 123/203; 123/220; 123/244; 123/59 EC
[58] Field of Search .......... 123/59 EC, 203, 220, 123/243, 244

[56] References Cited

U.S. PATENT DOCUMENTS

| | | | |
|---|---|---|---|
| 1,131,072 | 3/1915 | Morin | 123/220 X |
| 2,113,602 | 4/1938 | Pratt | 123/59 EC X |
| 3,535,059 | 10/1970 | Kalkbrenner | 418/60 |
| 3,902,464 | 9/1975 | Lay | 123/244 |
| 3,924,576 | 12/1975 | Siewert | 123/203 X |

Primary Examiner—Michael Koczo
Attorney, Agent, or Firm—Ian C. McLeod

[57] ABSTRACT

A dual rotor type rotary engine with primary and secondary rotor compartments around each rotor is described. The engine operates by activating in sequence an ignition means in the presence of a fuel and air mixture in primary and secondary compartments around one rotor and in primary and secondary rotor compartments around the other rotor. The engine is provided with a central housing between the rotors having a confined space for receiving hot exhaust gases from primary rotor compartments, for mixing with air introduced into the confined space and for conveying the mixture to secondary rotor compartments. The fuel, air and hot exhaust gas mixture in the secondary rotor compartments operates on a reduced amount of fuel by comparison to the fuel and air mixture in the primary compartments. The central housing preferably has air inlets on either side of the confined space to heat inlet air supplied to the primary rotor compartments by heat transfer from the hot surfaces and exhaust gases. The rotary engine is also provided (1) with rotary inlet and outlet valve means into and from the primary and secondary rotor compartments preferably in the form of rotary inlet valve tubes and outlet valve tubes with openings for supplying air or air mixed with hot exhaust gases to the compartments and for removing hot exhaust gases from both compartments and (2) preferably with inlet and exhaust gas manifolds for common inletting to and exhausting of gases from the rotor compartments through the valve tubes.

17 Claims, 35 Drawing Figures

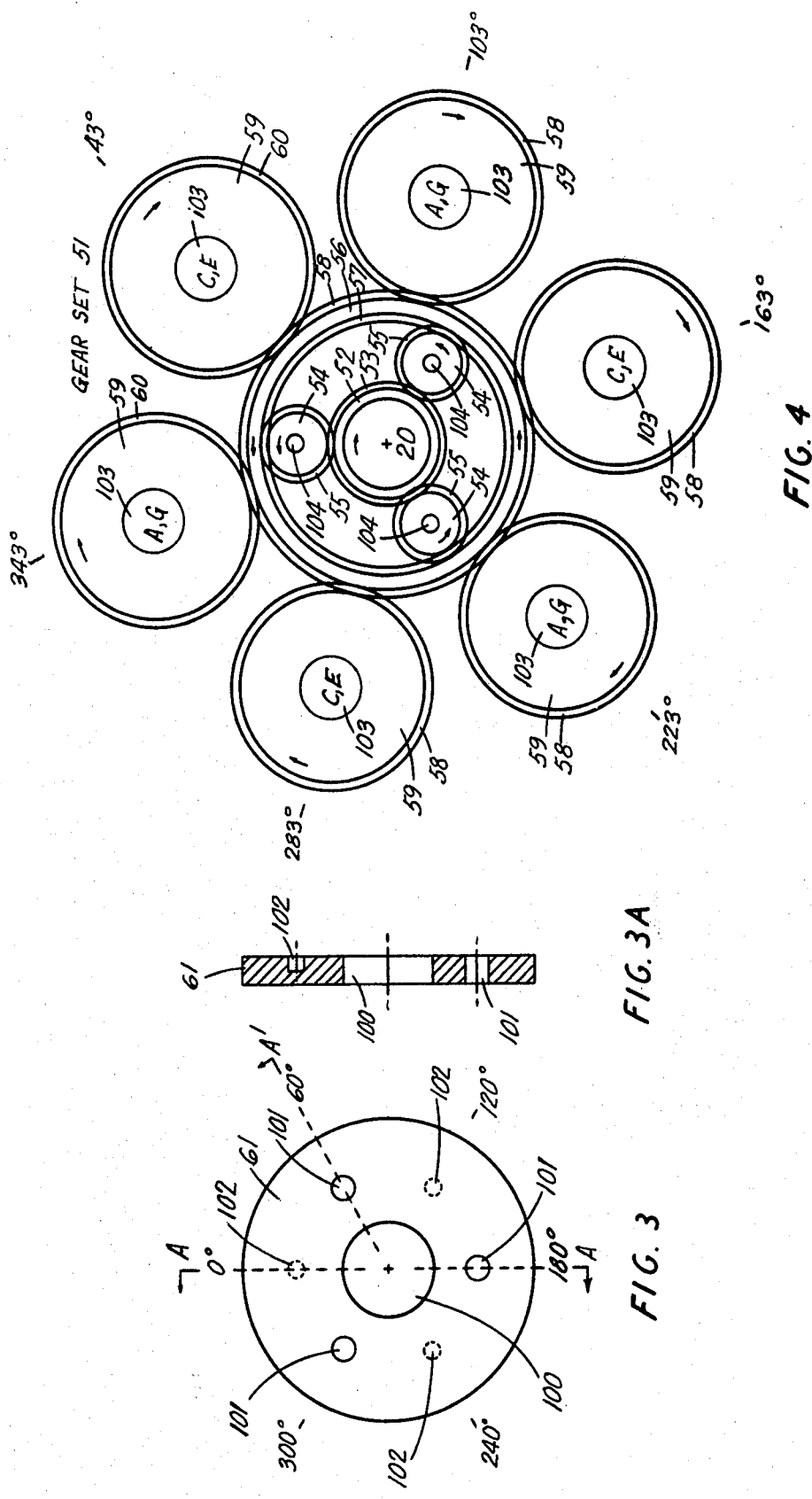

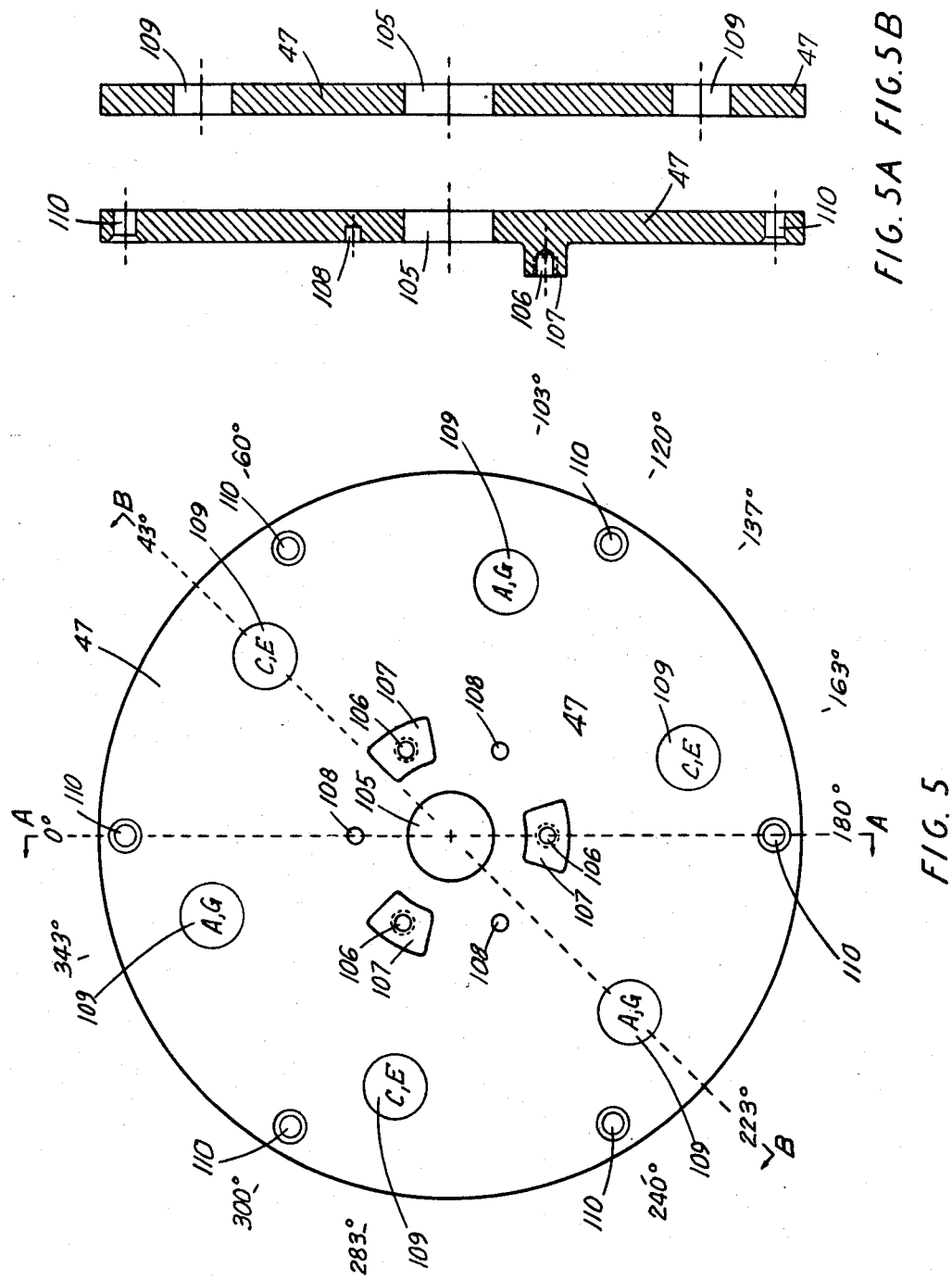

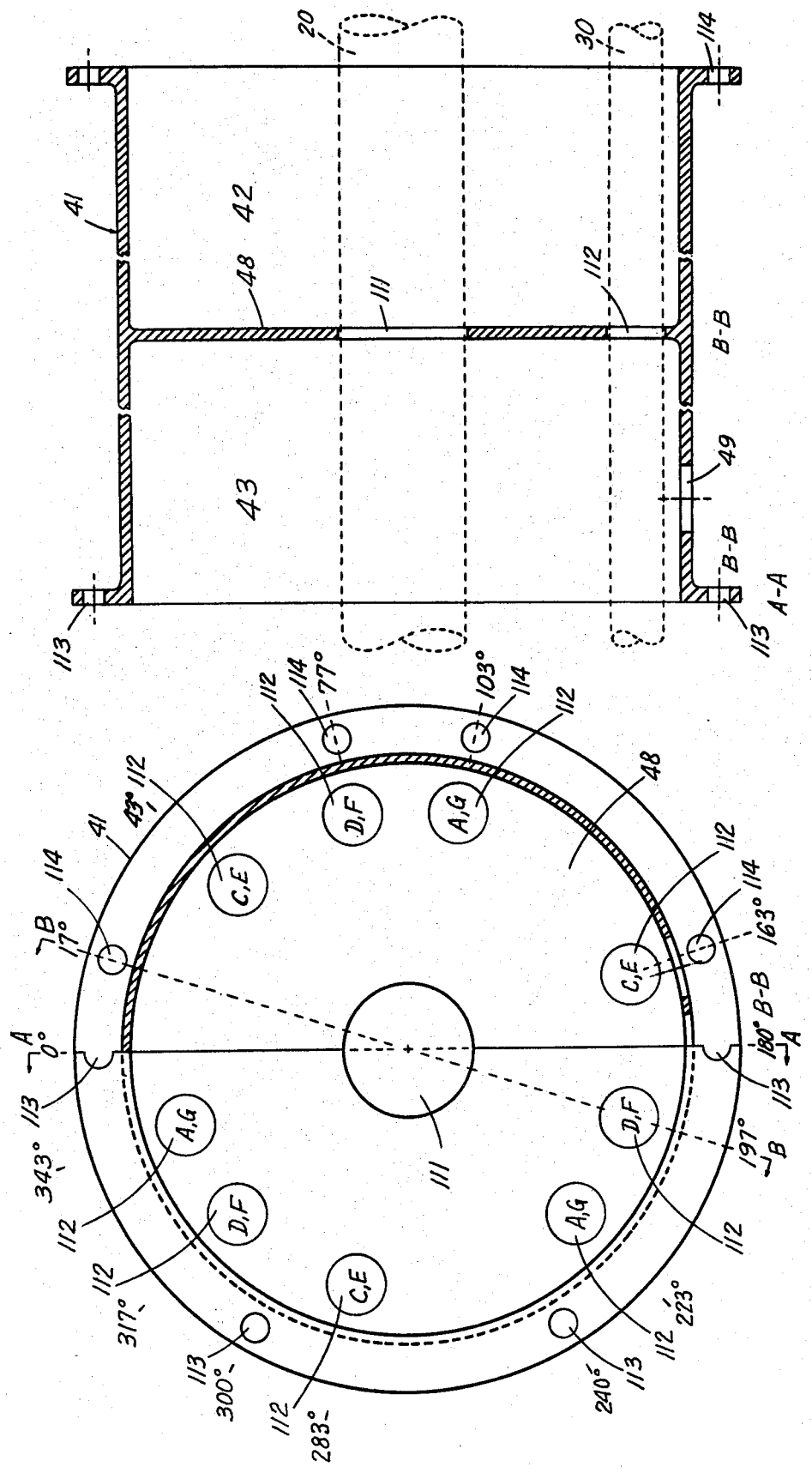

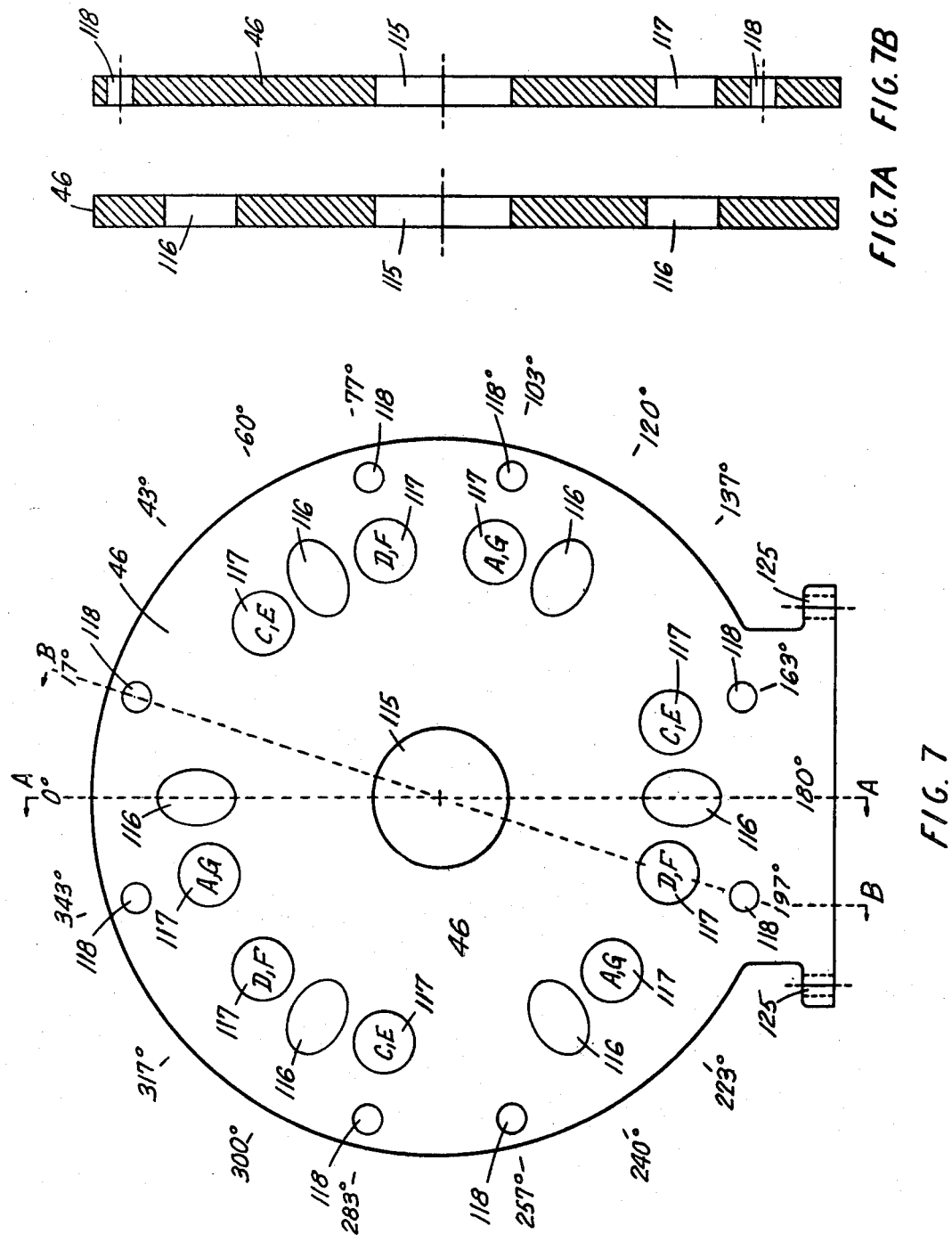

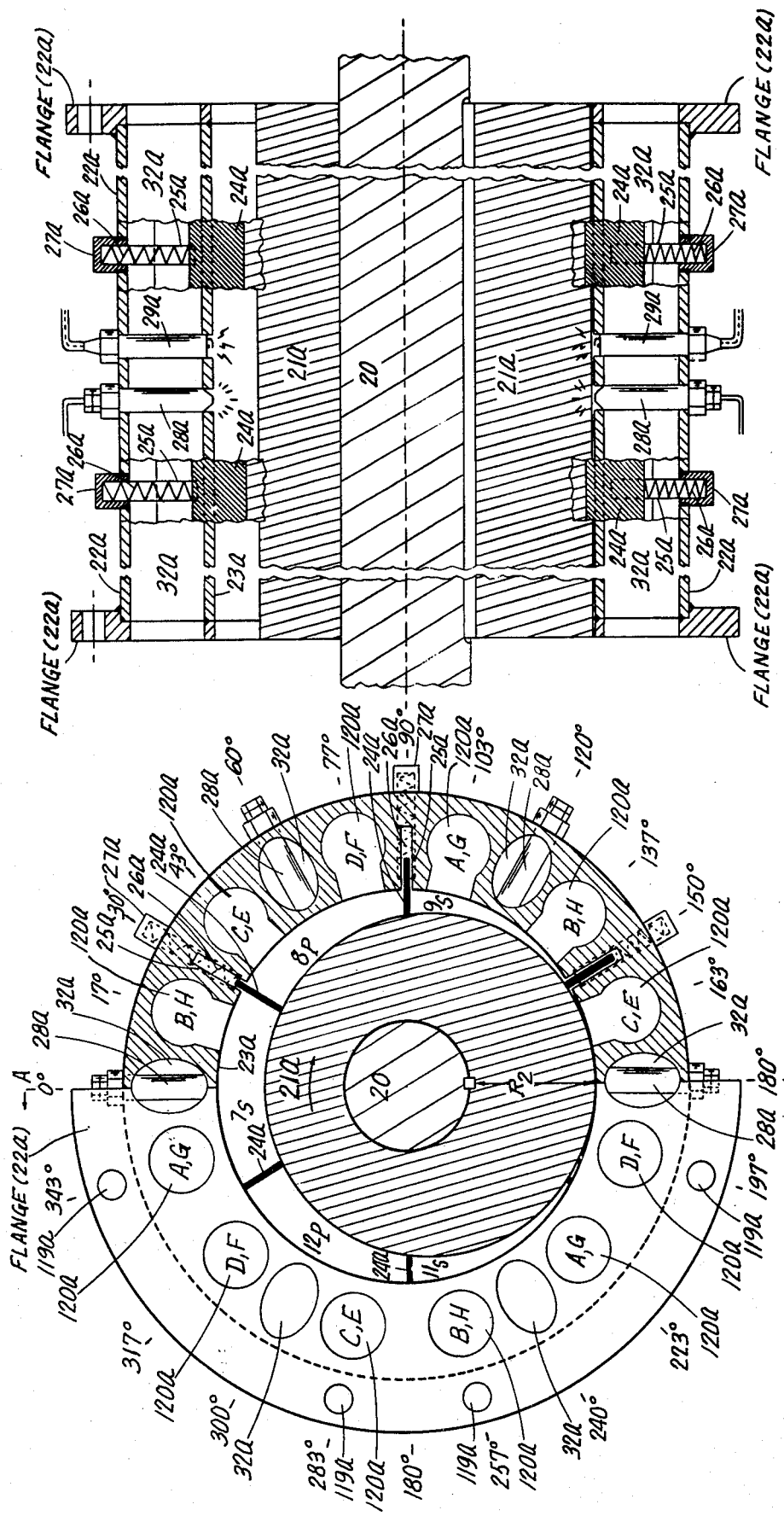

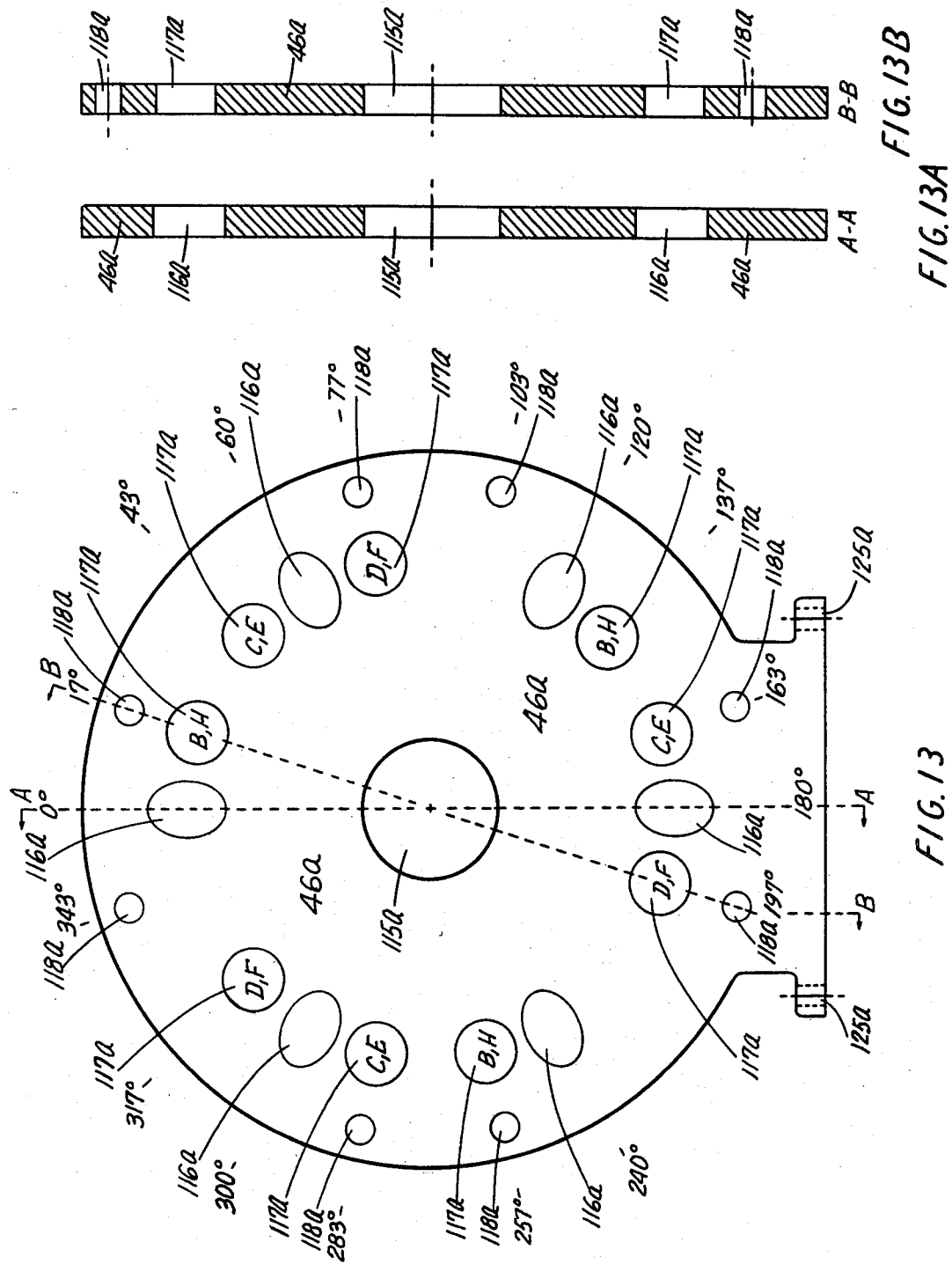

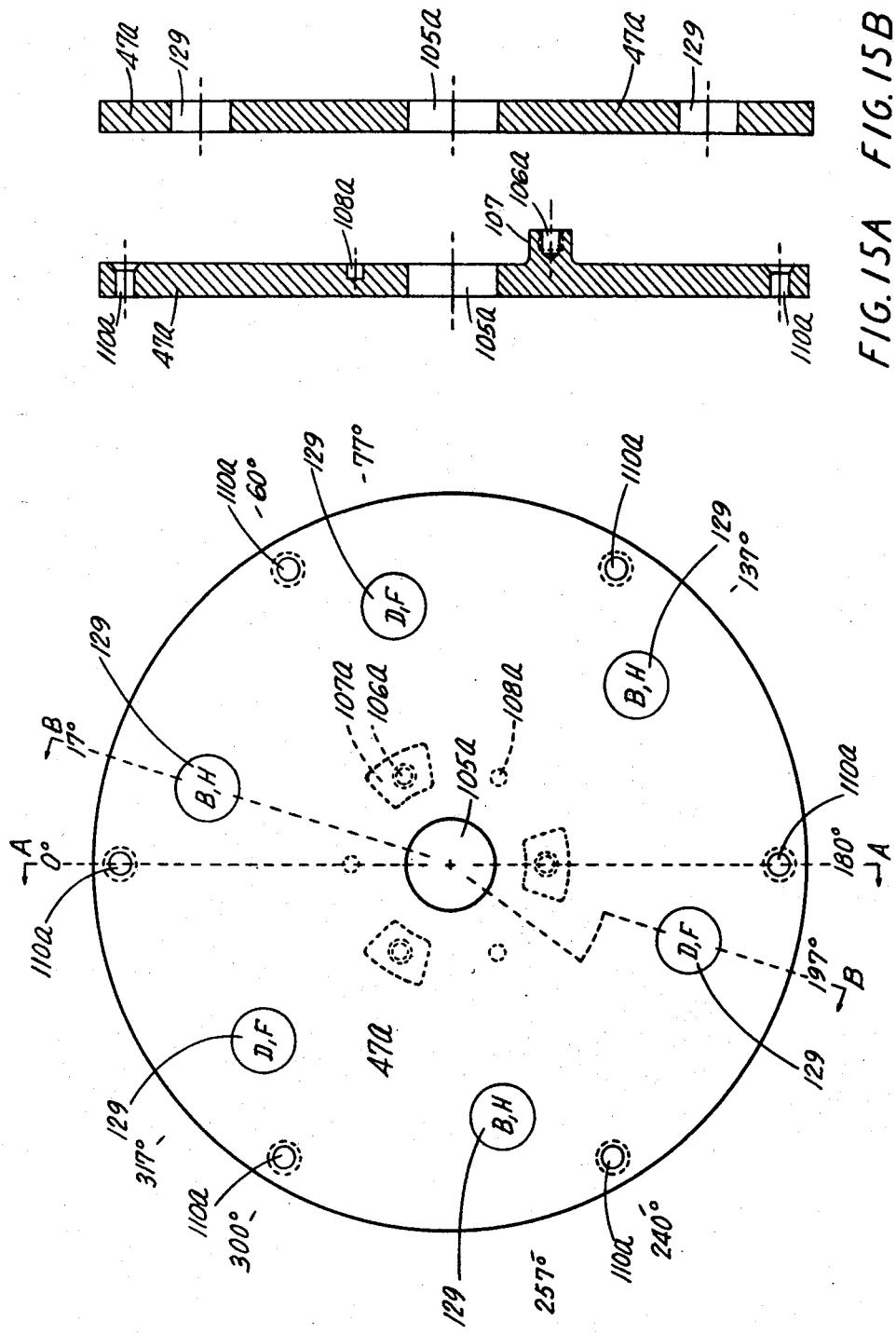

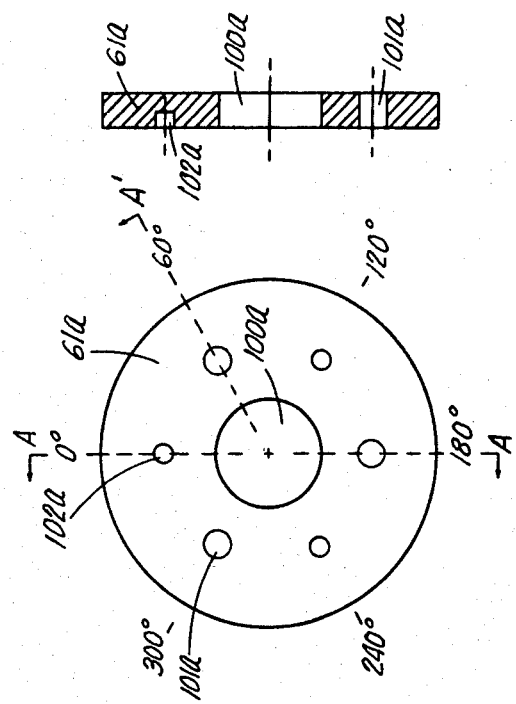
FIG. 17A
FIG. 17
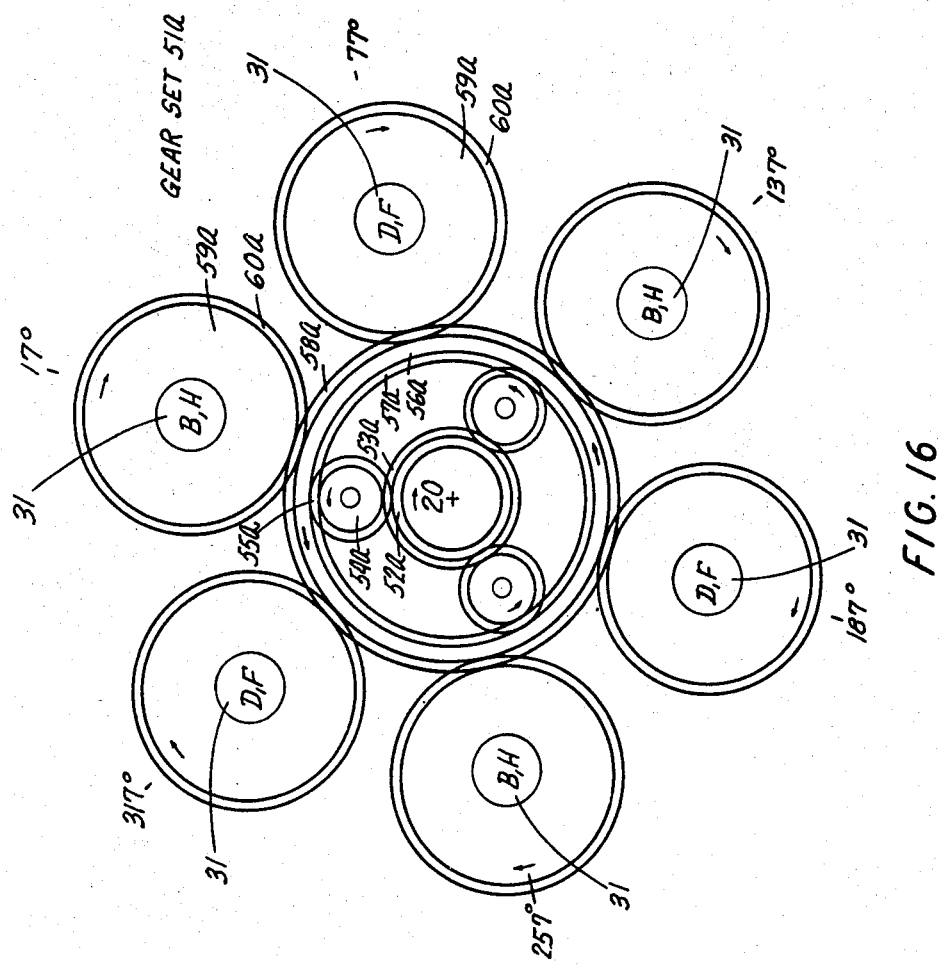
FIG. 16

TWO-STROKE (ONE CRANKSHAFT REVOLUTION) CYCLE

TABLE I - FIRING SEQUENCE

| CRANKSHAFT ROTATION | FIRING CHAMBER | FIRING CHAMBER |
|---|---|---|
| 0° | | |
| 30° | 1 | 10 |
| 60° | | |
| 90° | 2 | 11 |
| 120° | | |
| 150° | 3 | 12 |
| 180° | | |
| 210° | 4 | 7 |
| 240° | | |
| 270° | 5 | 8 |
| 300° | | |
| 330° | 6 | 9 |
| 360° | | |

TABLE II - SEQUENCE OF EVENTS

| CRANKSHAFT ROTATION | EVENTS IN CHAMBER 1 | EVENTS IN CHAMBER 10 |
|---|---|---|
| 0° | VALVE 'A' OPEN, 'B' CLOSED | VALVE 'E' OPEN, 'F' CLOSED |
| 30° | VALVE 'A' CLOSED, 'B' CLOSED FIRING, EXPANSION BEGINS | VALVE 'E' CLOSED, 'F' CLOSED FIRING, EXPANSION BEGINS |
| 60° | | |
| 90° | | |
| 120° | | |
| 150° | | |
| 180° | VALVE 'B' OPEN, EXHAUST BEGINS | VALVE 'F' OPEN, EXHAUST BEGINS |
| 210° | | |
| 240° | | |
| 270° | | |
| 300° | | |
| 330° | VALVE 'A' OPEN, INTAKE INJECTION | VALVE 'E' OPEN, INTAKE INJECTION |
| 360° | VALVE 'A' OPEN, 'B' CLOSED | VALVE 'E' OPEN, 'F' CLOSED |

FOUR-STROKE (TWO CRANKSHAFT REVOLUTIONS) CYCLE

TABLE III - FIRING SEQUENCE

| CRANKSHAFT ROTATION | FIRING CHAMBER | FIRING CHAMBER |
|---|---|---|
| 0° | | |
| 30° | | 10 |
| 60° | | |
| 90° | | 11 |
| 120° | | |
| 150° | | 12 |
| 180° | | |
| 210° | | 7 |
| 240° | | |
| 270° | | 8 |
| 300° | | |
| 330° | | 9 |
| 360° | | |
| 390° | 1 | |
| 420° | | |
| 450° | 2 | |
| 480° | | |
| 510° | 3 | |
| 540° | | |
| 570° | 4 | |
| 600° | | |
| 630° | 5 | |
| 660° | | |
| 690° | 6 | |
| 720° | | |

TABLE IV - SEQUENCE OF EVENTS

| CRANKSHAFT ROTATION | EVENTS IN CHAMBER 1 | EVENTS IN CHAMBER 10 |
|---|---|---|
| 0° | VALVE 'B' CLOSED, EXHAUST ENDS VALVE 'A' OPEN, INTAKE BEGINS | INJECTION |
| 30° | | FIRING EXPANSION BEGINS |
| 60° | | |
| 90° | | |
| 120° | | |
| 150° | | |
| 180° | VALVE 'A' CLOSED, INTAKE ENDS COMPRESSION BEGINS | VALVE 'F' OPEN, EXHAUST BEGINS |
| 210° | | |
| 240° | | |
| 270° | | |
| 300° | | |
| 330° | | |
| 360° | INJECTION | VALVE 'F' CLOSED, EXHAUST ENDS VALVE 'E' OPEN, INTAKE BEGINS |
| 390° | | |
| 420° | | |
| 450° | | |
| 480° | | |
| 510° | | |
| 540° | VALVE 'B' OPEN, EXHAUST BEGINS | VALVE 'E' CLOSED, INTAKE ENDS COMPRESSION BEGINS |
| 570° | | |
| 600° | | |
| 630° | | |
| 660° | | |
| 690° | | |
| 720° | VALVE 'B' CLOSED, EXHAUST ENDS VALVE 'A' OPEN, INTAKE BEGINS | |

ROTARY INTERNAL STAGE COMBUSTION ENGINE

BACKGROUND OF THE INVENTION

1. Field of the Invention

The present invention relates to a dual rotor type rotary engine with primary rotor compartments for ignition of a fuel and air mixture and secondary rotor compartments for ignition of fuel and air mixed with exhaust gases around each rotor. In particular, the present invention relates to a rotary engine with rotary tubular valves and with regenerative heat exchange between inlet air and hot exhaust gases.

2. Prior Art

In my U.S. Pat. No. 3,902,464, I described a rotary internal combustion engine having dual, eccentric cylindrically shaped rotors mounted on a shaft in separate closed housings such that the radius of maximum eccentricity from the shaft of one rotor is 180° around the shaft from the other rotor. Sliding abutments are provided between the rotors and housings to form variable volume compartments in an Otto cycle, four stroke engine. Special valve means using flathead or poppet type valves with cams between the housings is described for inletting a fuel-air mixture into each compartment and for removing the exhaust gases from each compartment. The engine provides an especially useful design in regard to emissions control; conventional internal combustion type rotary engines tend to be difficult and expensive in reducing pollution to meet current environmental standards.

In my U.S. application Ser. No. 949,196, filed Oct. 6, 1978, I described tubular rotary valve means in a rotary engine which is used in the present invention. Rotary inlet valve tubes and outlet valve tubes are provided around the rotors having openings leading into the rotor compartments. The tubes are rotated by planetary gear sets including a central gear on the shaft supporting the rotors.

The use of rotary tubular inlet valve means for engines is generally known, such as the valve described in U.S. Pat. No. 3,535,059 to Kalkbrenner. A curtain valve is used for the outlet of steam in the Kalkbrenner engine which also has only a single variable volume compartment per rotor. The engine is described as being suitable for miniaturization. It is believed that there is other prior art showing tubular valves.

SUMMARY OF THE INVENTION

Objects

It is an object of the present invention to provide an improved dual rotor type rotary engine which is adapted to a lean burn of a fuel-air mixture mixed with exhaust gases after an initial rich burn of a fuel and air mixture which produces the exhaust gases, thereby providing reduced unburned hydrocarbons from the engine. It is further an object of the present invention to provide an improved rotary engine which provides for efficient heating of inlet air to the engine by means of heat transfer from hot surfaces and exhaust gases. It is further an object of the present invention to provide a preferred rotary engine which is relatively simple and inexpensive to construct by comparison to rotary engines of the prior art. These and other objects will become increasingly apparent by reference to the following description and the drawings.

GENERAL DESCRIPTION

The present invention relates to an improved rotary internal combustion engine with a rotary shaft defining a longitudinal axis of rotation and mounting dual eccentric rotors spaced apart on the shaft with each rotor mounted in a separate housing and with chamber volume varying means between the rotors and housings so as to provide multiple variable volume gas compression compartments around each rotor, with fuel injection means and air inlet valve means into and hot exhaust gas outlet valve means from the compartments, wherein in succession around each rotor a compressed fuel and air mixture is ignited by an ignition means in the compartments to provide the internal combustion, the improvement which comprises: multiple primary and multiple secondary compartments around each rotor each with rotary inlet and outlet valve means and with fuel injection means and ignition means; conduit means for supplying hot exhaust gas from the outlet valve means from the primary compartments through the inlet valve means to the secondary compartments; a confined space with an air supply means in the conduit means between the primary and secondary compartments for receiving the hot exhaust gas from the primary compartments and for distributing the hot exhaust gases mixed with air to the secondary rotor compartments, wherein a compressed fuel and air mixture in the primary and the secondary compartments around each rotor is ignited by the ignition means in succession and wherein the fuel and air mixture in the secondary compartments is diluted with hot exhaust gas so as to provide a fuel, air and hot exhaust gas mixture which can be lean in fuel.

The present invention also relates to the method for generating power from a rotary shaft by providing a rotary internal combustion engine with a rotary shaft defining a longitudinal axis of rotation and mounting dual eccentric rotors spaced apart on the shaft with each rotor mounted in a separate housing and with chamber volume varying means between the rotors and the housings so as to provide multiple variable volume gas compression compartments around each rotor, with valved fuel and rotary tubular air inlet means into and rotary tubular hot exhaust gas outlet means from the compartments adjacent both rotors wherein in succession around each rotor a compressed fuel and air mixture is provided in a compartment and ignited by an ignition means in the compartment to provide the combustion, the improvement which comprises: providing multiple primary and multiple secondary compartments around each rotor each with rotary inlet and outlet valve means and with fuel injection means and ignition means; supplying hot exhaust gas from exhaust valve means of the primary compartments through conduit means to secondary compartments through inlet valve means; providing a confined space with an air supply means in the conduit means between the primary and secondary compartments for receiving the hot exhaust gas from the primary compartments and for distributing the hot exhaust gases mixed with air to the secondary rotor compartments; and igniting a fuel and air mixture in primary and secondary compartments around each rotor with the ignition means in succession wherein the fuel and air mixture in the secondary compartments is diluted with hot exhaust gas so as to provide a fuel, air and hot exhaust gas mixture which can be lean in fuel.

In particular the present invention relates to the improvement in a rotary internal combustion engine operable by igniting a fuel and air mixture in sealed, variable volume compartments in the engine so as to produce rotation of a shaft and then exhausting the ignited gas from the engine including fuel injection means leading into each compartment and an ignition means in each compartment, wherein the engine is of the type which includes the shaft defining a longitudinal axis and with spaced apart bearing surfaces for journaled rotation of the shaft on the axis between two spaced apart sections of the shaft; two spaced apart identically shaped rotors eccentrically mounted on the spaced apart sections of the shaft each having a radius of maximum eccentricity from the longitudinal axis of the shaft such that the radius of maximum eccentricity of one rotor is 180° around the shaft from the same radius of the other rotor; closed housings supporting the shaft mounted around the rotors each with a cylindrically shaped inner surface spaced from the radius of maximum eccentricity of the rotor; multiple resiliently mounted sliding abutments on each of the housings for continuous slidable and sealed contact with the rotors or on the rotors for slidable and sealed contact with the inner surface of the housing through 360° of revolution of the shaft so as to form the sealed variable volume compartments between each of the rotors and housings; two separate sets of planetary gears mounted radially of the shaft outside the housings wherein in each set a central gear is mounted around the shaft and outer planet gears are drivable by inner planet gears which are drivable by the central gear; and multiple rotary inlet valve tubes and multiple outlet valve tubes leading to each compartment, the tubes defining a longitudinal axis and mounted on the housings around the rotors parallel to the longitudinal axis of the shaft with openings in the tubes leading into corresponding openings in the housings leading to the compartments, wherein the outer planet gears are in the form of rings around the tubes and wherein one gear set rotates the inlet valve tubes and the other gear set rotates the outlet valve tubes such that in operation in succession each rotor compartment is provided with a fuel and air mixture, the rotors are rotated by ignition of the fuel and air mixture in the compartment and then the ignited gases are exhausted through the outlet valve tubes, the improvement which comprises: multiple primary and multiple secondary compartments around each rotor; inlet and outlet valve tubes each extending to a compartment of both rotors with partitioned sections in each tube so that a single tube is a separate inlet valve tube to compartments to both rotors or a separate outlet valve tube to compartments of both rotors; inlet and outlet gas manifolds at opposite ends of both of the housings, for common exhaust gas removal from the exhaust valve tubes and for common air inlet into the inlet valve tubes through openings in the tubes leading to one or the other of the gas manifolds; a confined space between the housings and around and concentric with the axis of the shaft with openings from the inlet and exhaust valve tubes into the confined space and with an air inlet opening into the confined space; and air inlets on both sides of the confined space, adjacent the housings and around and concentric with the axis of the shaft, wherein in operation the air is introduced through the air inlets to the inlet gas manifold, is passed through openings in the inlet valve tubes, into primary rotor compartments, compressed and mixed with fuel from the injection means, ignited in the primary rotor compartments by the ignition means, exhausted to the confined space through outlet valve tubes, mixed with air from the inlet opening into the confined space, introduced into inlet valve tubes for secondary rotor compartments, compressed and mixed with fuel from the injection means in a lean fuel and air mixture, ignited by an ignition means in the secondary compartments, exhausted to an exhaust gas manifold through outlet valve tubes by means of the openings in the valve tubes and then vented outside the engine through openings in the exhaust gas manifold.

Also the present invention relates to the improvement in a rotary engine with fuel inlet and air inlet into and exhaust gas removal valve means from variable volume rotor compartments wherein the engine includes a rotatable shaft defining a longitudinal axis and mounting two spaced apart eccentric rotors on the shaft so that there is a central section between the rotors, wherein each of the rotors are in closed housings, wherein in succession a fuel and air mixture is provided by the fuel and air inlet valve means to the rotor compartments and ignited by ignition means so as to rotate the rotors on the axis and then exhausted by the outlet valve means and wherein the variable volume rotor compartments are formed by sliding abutments between the rotors and the housings, the improvement which comprises: multiple primary and multiple secondary rotor compartments around each rotor; adjoining inlet and outlet gas manifolds concentric with the axis of the shaft mounted at opposite ends of the housings furthest from the central section of the shaft for common air inlet to or for common exhaust gas removal from the rotor compartments; two separate sets of planetary gears each set having axes of rotation parallel to the axis of the shaft and mounted radially around the shaft on opposing ends of the gas manifolds and driven by a central gear on the shaft; a confined space with an air inlet opening around and concentric with the central section of the shaft and between the housings; air inlets each with an opening provided between the housings and on both sides of and separate from the confined space and concentric with and around the axis of the shaft in the central section connected to conduit means in the housings leading to the inlet gas manifolds; multiple rotary inlet tubes as the inlet valve means and outlet tubes as the outlet valve means each having a longitudinal axis mounted around and through both of the housings and around the rotors parallel to the longitudinal axis of the shaft with an outer ring gear from one set of planetary gears around each of the tubes and with openings in the tubes adjacent the rotors leading to openings in the housings for separately supplying air to the rotor compartments and then for removing exhaust gas including partitions dividing each of the tubes into sections as well as openings in the tubes leading into an air inlet or exhaust gas manifolds and openings in the tubes leading into the confined space, wherein in operation air is introduced through the air inlets and heated by heat transfer from the confined space and housings, is passed through the housing into the inlet valve tubes through the openings in an inlet gas manifold, is introduced, compressed, mixed with fuel and ignited in the primary rotor compartments, is exhausted to the confined space through the openings in outlet valve tubes in the confined space and mixed with air, transferred again through the inlet valve tubes to secondary rotor compartments through openings in the inlet valve tubes in the confined space, compressed, mixed with fuel and ignited in the secondary compartments, exhausted by the outlet valve tubes to the outlet gas manifold by means of openings in the outlet valve tubes to the outlet gas manifold and then is exhausted outside the engine through an opening in the outlet gas manifold.

Further the present invention relates to the improvement in a rotary engine with fuel injection and swirl means, air inlet into and exhaust gas removal outlet valve means from variable volume rotor compartments wherein the engine includes a rotatable shaft defining a longitudinal axis mounting two spaced apart eccentric rotors on the shaft in two separate closed housings such that in succession a fuel and air mixture is provided by the fuel injection means and air inlet valve means in the variable volume compartments between the rotors and the housings and ignited by igniter means to rotate the rotors on the axis and then exhaust gas is removed by the outlet valve means, the improvement which comprises: multiple primary and multiple secondary rotor compartments around each rotor; separate sets of planetary gears mounted radially around the shaft outside of each of the housings, wherein in each set outer ring gears with axes of rotation which are on a circle concentric with the shaft axis are driven by a double ring gear concentric with the shaft with outer teeth meshing with teeth on the outer ring gears and with inner teeth which mesh with teeth on a plurality of inner gears mounted on the housing with axes of rotation on a circle concentric with the shaft axis which in turn mesh with teeth on a central gear mounted around the shaft, wherein the outer ring gears are driven through the rotation of the shaft; multiple rotary inlet valve tubes and multiple outlet valve tubes as the air inlet and outlet valve means each having a longitudinal axis mounted through the housings around both rotors parallel to the longitudinal axis of the shaft with openings in the tubes leading into corresponding openings in the housing each leading to a rotor compartment and with two partitioned sections in the tubes between the rotors, wherein the outer ring gears are mounted around the inlet and outlet valve tubes to rotate the tubes; and a confined space with an air inlet opening mounted between the housings around and concentric with the shaft through which the inlet and exhaust tubes are mounted with openings in the tubes leading to the confined space, wherein in operation air is provided to primary compartments by the inlet valve tubes on one side of the partitioned sections, fuel is provided in the primary compartments by the fuel injection means and mixed with the air which is ignited in the primary rotor compartments is exhausted through openings in the exhaust valve tubes to the confined space and is mixed with air and transferred through openings in the inlet valve tubes in the other partitioned sections leading to the secondary rotor compartments, is introduced into the secondary rotor compartments, fuel is provided in the secondary rotor compartments by the fuel injection valve means mixed with the exhaust gas and air, the mixture is ignited in the secondary rotor compartments and then is exhausted through outlet valve tubes, wherein the ignition is in succession around the rotors.

IN THE DRAWINGS

FIGS. 1 and 1A are end cross-sectional views of the dual rotor and housing assemblies or modules in the improved rotary engine of the present invention as shown in FIG. 2 particularly illustrating the positioning of the rotors relative to each other, the openings for mounting rotary inlet and outlet valve tubes and the primary rotor compartments (P) and secondary rotor compartments (S) around each rotor.

FIG. 2 is a longitudinal across-sectional view of the rotary valve tube, dual rotor type rotary engine of the present invention particularly illustrating a central housing with a confined space for receiving exhaust gases from the primary rotor compartments and for conveying the hot exhaust gases mixed with air to secondary rotor compartments for mixing with fuel and for ignition, and then exhaust from the secondary rotor compartments S as shown by arrows to or from openings in the rotary tubes.

FIGS. 3 to 17A show the details of the construction of the component parts of the improved rotary engine.

FIG. 3 is an end view of a gear cover plate and FIG. 3A is a cross-sectional view thereof.

FIG. 4 is an end view of a first gear set.

FIG. 5 is an end view of a manifold cover plate which supports the gear set together with the gear cover plate and FIGS. 5A and 5B are cross-sectional views thereof.

FIG. 6 is an end view in partial section of inlet and outlet gas manifolds to which the manifold cover plate of FIG. 5 is attached at one end, illustrating the positioning of holes for the inlet and outlet tubes.

FIG. 6A is a cross-sectional view of FIG. 6.

FIG. 7 is an end view of a support plate which attaches to the other end of the gas manifold and FIGS. 7A and 7B are cross-sectional views thereof.

FIG. 8 is an end partial cross-sectional view of a first rotor module and FIG. 8A is a longitudinal cross-sectional view thereof.

FIG. 9 is an end view of a rotor support plate for the end of the first rotor module and FIGS. 9A and 9B are cross-sectional views thereof. The rotor support plate is duplicated adjacent to the second rotor.

FIG. 10 is an end partial sectional view of the central housing with a confined space for receiving exhaust gases from primary rotor compartments and for conveying them mixed with air to secondary rotor compartments and air inlets for heating air by passage adjacent the confined space and through the rotor housings.

FIG. 11 is a schematic view showing the positioning of the inlet and outlet valve tubes and slots for supplying air to and removing exhaust from the rotor compartments wherein the slots as shown are for ease in visualizing engine operation.

FIG. 12 is an end view of the second rotor module and FIG. 12A is a longitudinal cross-sectional view thereof.

FIG. 13 is an end view of a second support plate identical to the one shown in FIG. 7, except for the location of the holes.

FIG. 14 is an end partial sectional view of a second inlet and outlet gas manifold which attaches to the second support plate and FIG. 14A is a cross-sectional view thereof.

FIG. 15 is an end view of a second gas manifold cover plate which is a mirror image of the manifold cover plate shown in FIG. 5, except for the location of the holes.

FIG. 16 is a front view of the second gear set which is identical in construction to the first gear set, FIG. 4, except for the location of the gears.

FIG. 17 is an end view of a second gear cover plate identical to that shown in FIG. 3 and FIG. 17A is a cross-sectional view thereof.

Tables I to IV show the firing and sequence of events in the preferred rotary engine.

SPECIFIC DESCRIPTION

FIGS. 1, 1A, 2, 8 and 8A basically show the construction of the dual rotor rotary engine of the present invention. The engine uses rotary inlet and outlet valve tubes and planetary gear sets of the kind generally described in the U.S. application Ser. No. 949,196, filed Oct. 6, 1978. The improvement of the present invention is in providing lean-burn secondary ignition compartments which utilize hot exhaust gases from primary ignition compartments as well as an efficient means of heat transfer to incoming cool air into the engine from hot exhaust gases and from cooling of the rotor housings. The engine is essentially air cooled.

Figures 1, 1A:
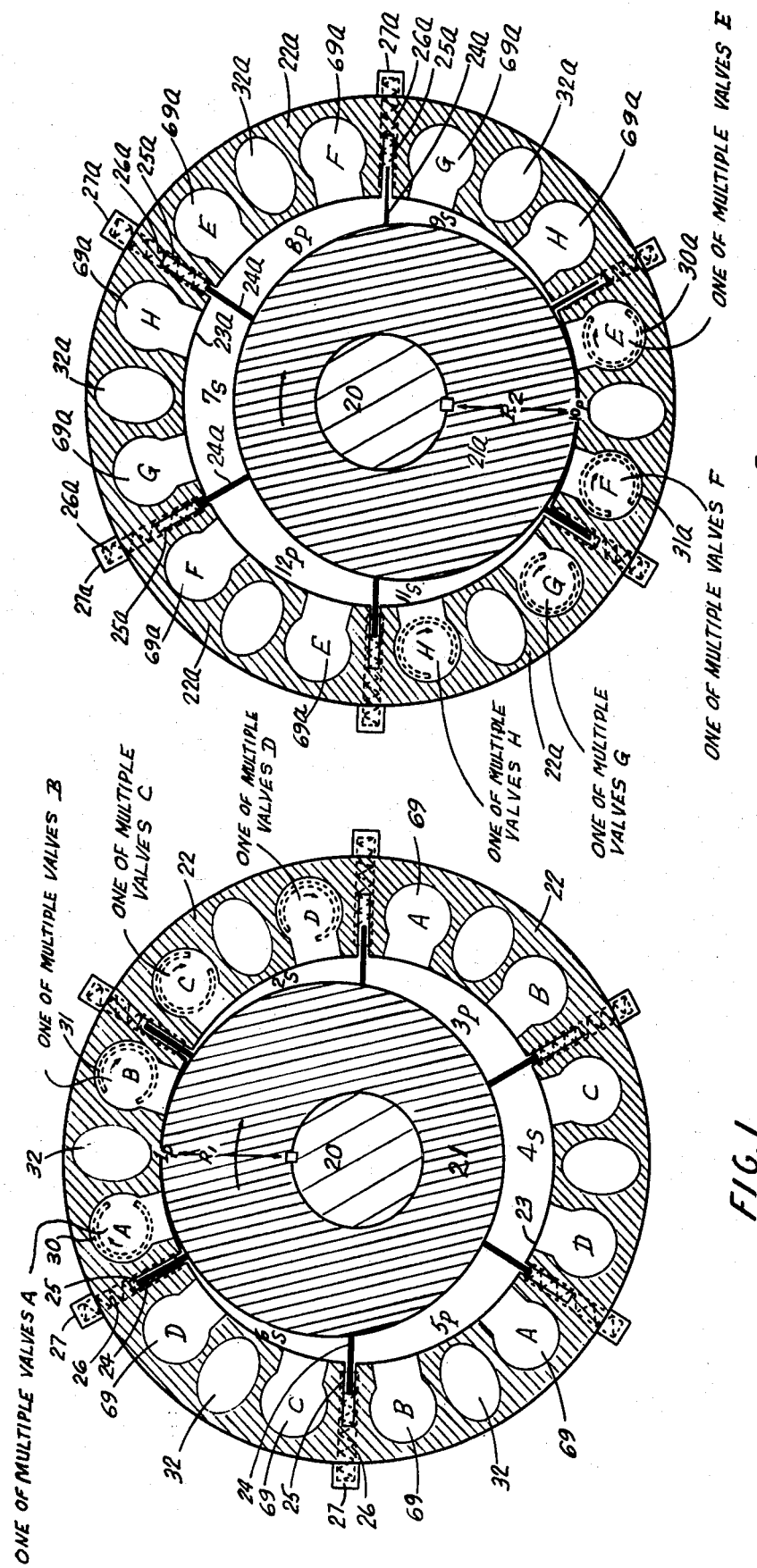
Figure 2:
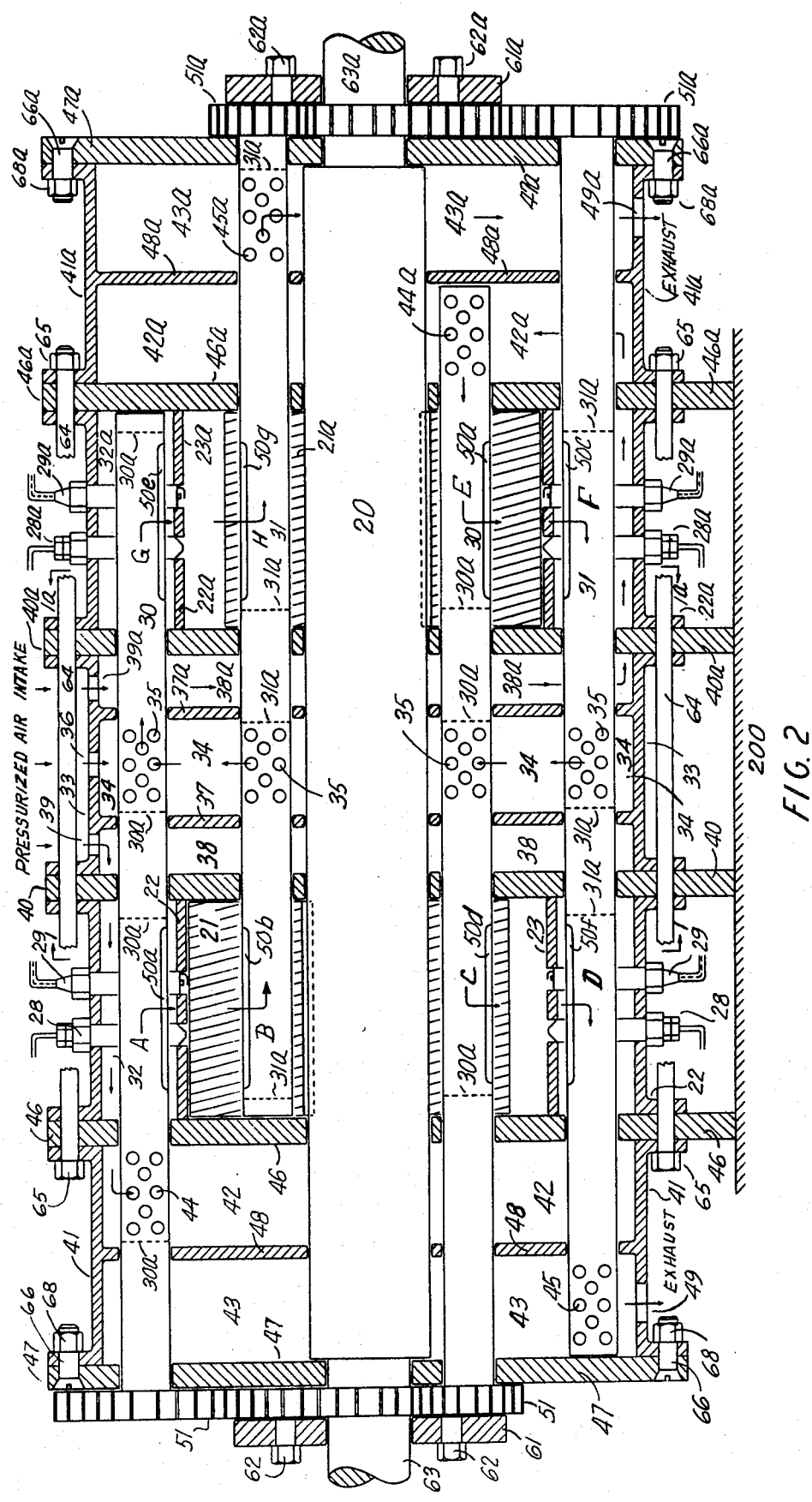

A cylindrical shaft 20 is provided defining a longitudinal axis of rotation. Two cylindrically shaped rotors 21 and 21a are mounted eccentrically on the shaft 20 such that their radii $R_1$ and $R_2$ of maximum eccentricity are 180° around the shaft 20 axis (FIGS. 1 and 2). The rotors 21 and 21a at the radii $R_1$ and $R_2$ of maximum eccentricity are in closely spaced relationship to cylindrical walls 23 and 23a of housings 22 and 22a forming part of the compartments 1 to 12 for the rotors 21 and 21a. The housings 22 and 22a support sliding abutments 24 and 24a which move up and down in slots 25 and 25a in the housings 22 and 22a. The abutments 24 and 24a are moveable against springs 26 and 26a and are in slideable contact with the rotors 21 and 21a, thereby forming sealed variable volume compartments 1 to 12 as shown in FIGS. 1 and 1A. The springs 26 and 26a are held in place by caps 27 and 27a on the housings 22 and 22a. The compartments 1 to 12 are each provided with a fuel injection and swirl means 28 and 28a and ignition means 29 and 29a. Around and through the housings 22 and 22a are provided cylindrical openings 69 as shown in FIGS. 1 and 1A which are for mounting inlet and outlet tubes 30 and 31 as shown in FIGS. 1 and 2. The tubes 30 and 31 included partitioned sections A to H as discussed more fully hereinafter. Also in the housings 22 and 22a are air inlet conduits 32 and 32a.

Between the housings 22 and 22a and around and concentric with the shaft 20 is a central housing 33 (shown in detail in FIGS. 10 and 10A) through which the inlet tubes 30 and outlet tubes 31 pass. The tubes each have partitions 30a or 31a which divide the tubes into Sections A to H. The central housing 33 includes a confined space 34 around the shaft 20. The tubes 30 and 31 are provided with openings 35 into the confined space 34. An air inlet opening 36 is provided leading into the confined space 34. On either side of the confined space 34 are walls 37 and 37a which separate the confined space 34 from air inlets 38 and 38a having openings 39 and 39a. The air inlets 38 and 38a lead into the openings 32 and 32a respectively in the housings 22 and 22a. The air inlets 38 and 38a are closed by rotor support plates 40 and 40a at the inner ends of the housings 22 and 22a. The confined space 34 holds hot exhaust gases from rotor 21 compartments which are introduced into other rotor 21a compartments preferably with a lean air and fuel mixture using sections B and C of the inlet and outlet valve tubes 30 and 31. Heat transfer to air in the air inlets 38 and 38a takes place from the confined space 34 through walls 37 and 37a and through plates 40 and 40a and housings 22 and 22a from the compartments 1 to 12.

Figures 14, 14A:
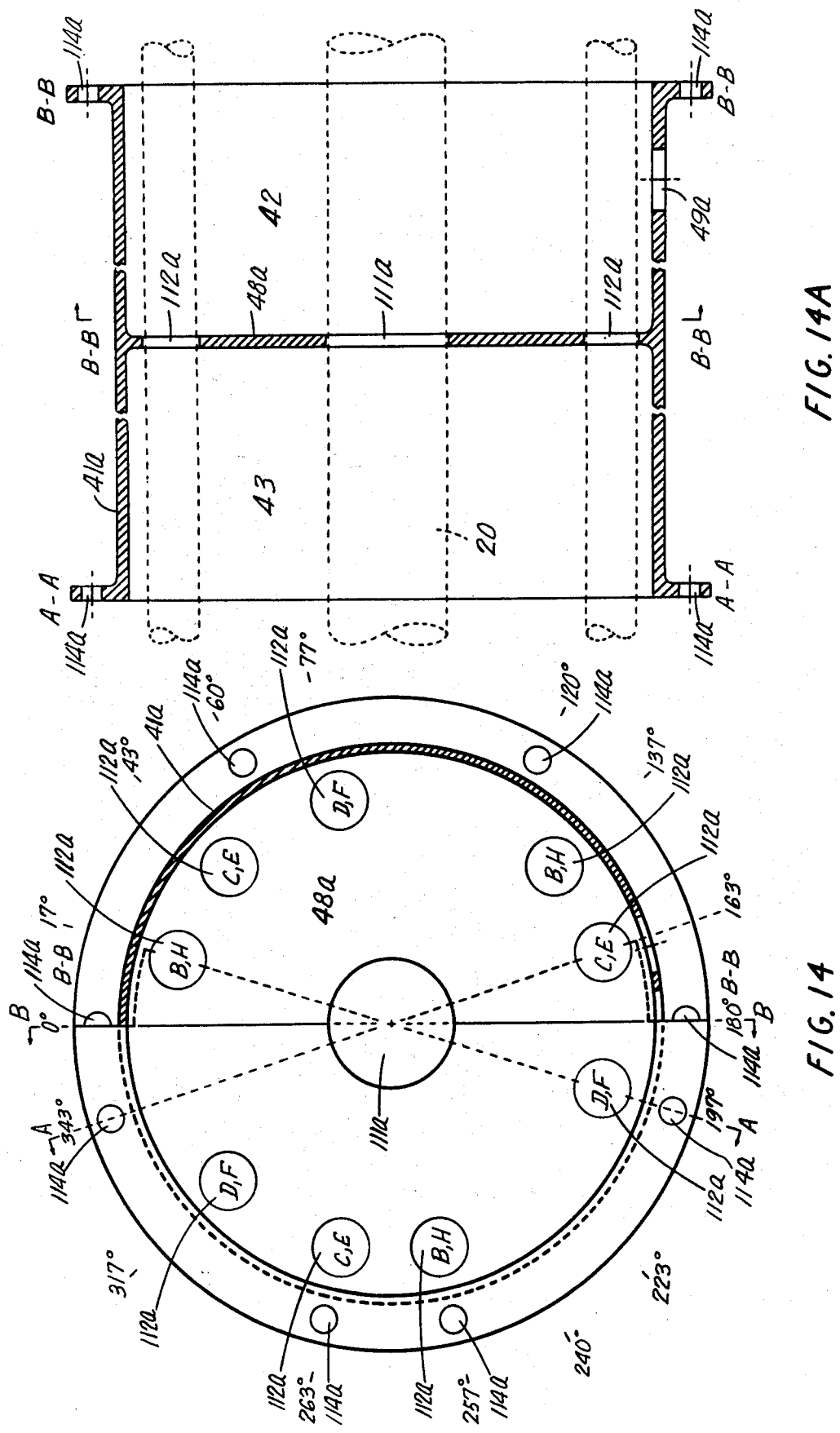

On the opposite sides of the housings 22 and 22a from the central housing 33 are provided inlet and outlet gas manifolds 41 and 41a shown in detail in FIGS. 6 and 14 with inlet gas chambers 42 and 42a and exhaust gas chambers 43 and 43a which provide for common gas connection to the inlet tubes 30 by means of holes 44 and 44a or to outlet tubes 31 by means of holes 45 and 45a. Support plates 46 and 46a shown in FIGS. 7, 7A, 7B, 13, 13A and 13B are provided between the housings 22 and 22a and manifolds 41 and 41a to provide the chambers 42 and 42a. Manifold cover plates 47 and 47a are shown in detail in FIGS. 5, 5A, 5B, 15, 15A and 15B. Central walls 48 and 48a are provided between the chambers 42 and 43 and 42a and 43a and allow heat transfer. Exhaust is vented through openings 49 and 49a in chambers 43 and 43a.

The shaft 20 is preferably journaled in the plates 40, 40a, 46, 46a, 47 and 47a and walls 37, 37a, 48 and 48a as shown in FIG. 2. The tubes 30 and 31 are journaled through several of the plates 40, 40a, 46, 46a, 47 and 47a as shown in FIG. 2.

The inlet tubes 30 and exhaust tubes 31 are mounted such that slots 50 to 50g lead to the rotor compartments 1 to 12 in a synchronized manner. The rotation of the tubes 30 and 31 is accomplished with planetary gear sets 51 and 51a. The gear sets 51 and 51a are mounted on manifold cover plates 47 and 47a around shaft 20. As shown in FIGS. 4 and 16 in each set 51 and 51a, central gears 52 and 52a are mounted around shaft 20. Inner gears 54 and 54a are driven by teeth 53 and 53a on the central gears 52 and 52a through teeth 55 and 55a on the inner gears 54 and 54a. Ring gears 56 and 56a with inner gear teeth 57 and 57a are driven by teeth 55 and 55a and outer gear teeth 58 and 58a drive ring gears 59 mounted around the inlet tubes 30 and teeth 60 as shown in FIG. 4 and ring gears 59a around outlet tubes 31 by teeth 60a as shown in FIG. 16. The gear sets 51 and 51a are held in place by gear cover plates 61 and 61a secured by bolts 62 and 62a to manifold cover plates 47 and 47a respectively around the shaft 20. As shown in FIG. 2, the shaft 20 includes two extensions 63 and 63a either or both of which can be coupled to a transmission or drive shaft (not shown). The plates 40, 40a, 46, 46a, the central housing 33 and the gas manifolds 41 and 41a adjacent the support plates 46 and 46a are held together with long studs 64 and nuts 65. Bolts 66 on the manifold cover plates 47 and 47a are flush with the outside surfaces of the plates 47 and 47a so as not to interfere with the gears 51 and 51a. Nuts 68 are attached to bolts 66. Various oil lubricating passages are provided for the journaled shaft 20 which are not shown.

In operation, compartments 1, 3 and 5 adjacent rotor 21 and compartments 8, 10, and 12 adjacent rotor 21a are primary rotor compartments in that they receive intake air directly (through slots A and E in the inlet tubes 30), while compartments 2, 4 and 6 adjacent rotor 21 and compartments 7, 9 and 11 adjacent rotor 21a are secondary rotor compartments in that they receive air mixed with hot exhaust gas (through slots C and G in inlet tubes 30) from the confined space 34, located as shown in FIG. 2, at mid-engine. Pressurized intake air is supplied at mid-engine through openings 39 and 39a, spreading to the sections A and E, thereby cooling the engine, and is exhausted via sections B and F into the confined space 34. The air from openings 39 and 39a goes into primary compartments 1, 3, 5, 8, 10 and 12 through rotary inlet tube 30, slots 50 and 50a in sections A and E, and after fuel injection by injector means 28 and 28a, compression and ignition means 29 and 29a (such as a spark or glow plug), is exhausted through outlet tubes 31 slots 50b and 50c in sections B and F to the confined space 34. Air inletted through opening 36, mixed with hot exhaust gases is fed from the confined space into secondary rotor compartments 2, 4, 6, 7, 9 and 11 through rotary inlet tubes 30 slots 50d and 50e in sections C and G, and after fuel injection by injector means 28 or 28a, compression, and ignition by ignitor means 29 or 29a, is exhausted through outlet tubes 31, slots 50f and 50g in sections D and H to the exhaust chambers 43 and 43a. The rotary valve tubes 30 and 31 are rotated by the sets of gears 51 and 51a mounted at the ends of the engine as previously described.

The details of the components of the engine as shown in FIG. 2 are as follows: starting from left to right of FIG. 2: gear cover plate 61 (FIG. 3), gear set 51 (FIG. 4) manifold cover plate 47 (FIG. 5), inlet and outlet gas manifold 41 (FIG. 6), support plate 46 (FIG. 7), rotor 21 (FIG. 8), support plate 40 and 40a (FIG. 9), central housing 33 (FIG. 10), inlet and outlet valve tubes (FIG. 11), rotor 21a (FIG. 12), support plate 46a (FIG. 13), manifold 41a (FIG. 14), manifold cover plate 47a (FIG. 15), gear set 51a (FIG. 16), and gear cover plate 61a (FIG. 17). The details of the construction of each part are described hereinafter.

The gear cover plate 61 shown in FIG. 3, includes a central opening 100 for the shaft extension 63 and holes 101 for bolts 62. Blind holes 102 (shown in broken lines) are for journaling gears 54. Openings 103 are for the inlet tubes 30 on which the ring gears 59 are mounted.

FIG. 4 shows the gear set 51 wherein pins 104 fit into holes 102 of the gear cover plate 61.

FIGS. 5, 5A and 5B show the manifold 51 cover plate 47 including a central opening 105 for the shaft extension 63. Threaded openings 106 on pedestal 107 are for bolts 62. Holes 108 are for shafts 104 of gears 54. Openings 109 are for inlet tubes 30. Openings 110 are for bolts 66.

FIG. 6 shows the manifold 41 in partial section and FIG. 6A shows the mainfold 41 in full section. Central hole 111 is for shaft 20 and openings 112 are for the inlet tubes 30 and outlet tubes 31. Openings 113 are for bolts 66 and openings 114 are for the stud 64.

FIG. 7 shows the details of support plate 46. A central hole 115 is for shaft 20. Holes 116 are for air inlets to chamber 42 from inlet opening 39. Openings 117 are for tubes 30 and 31. Openings 118 are for stud 64.

Figures 8, 8A:
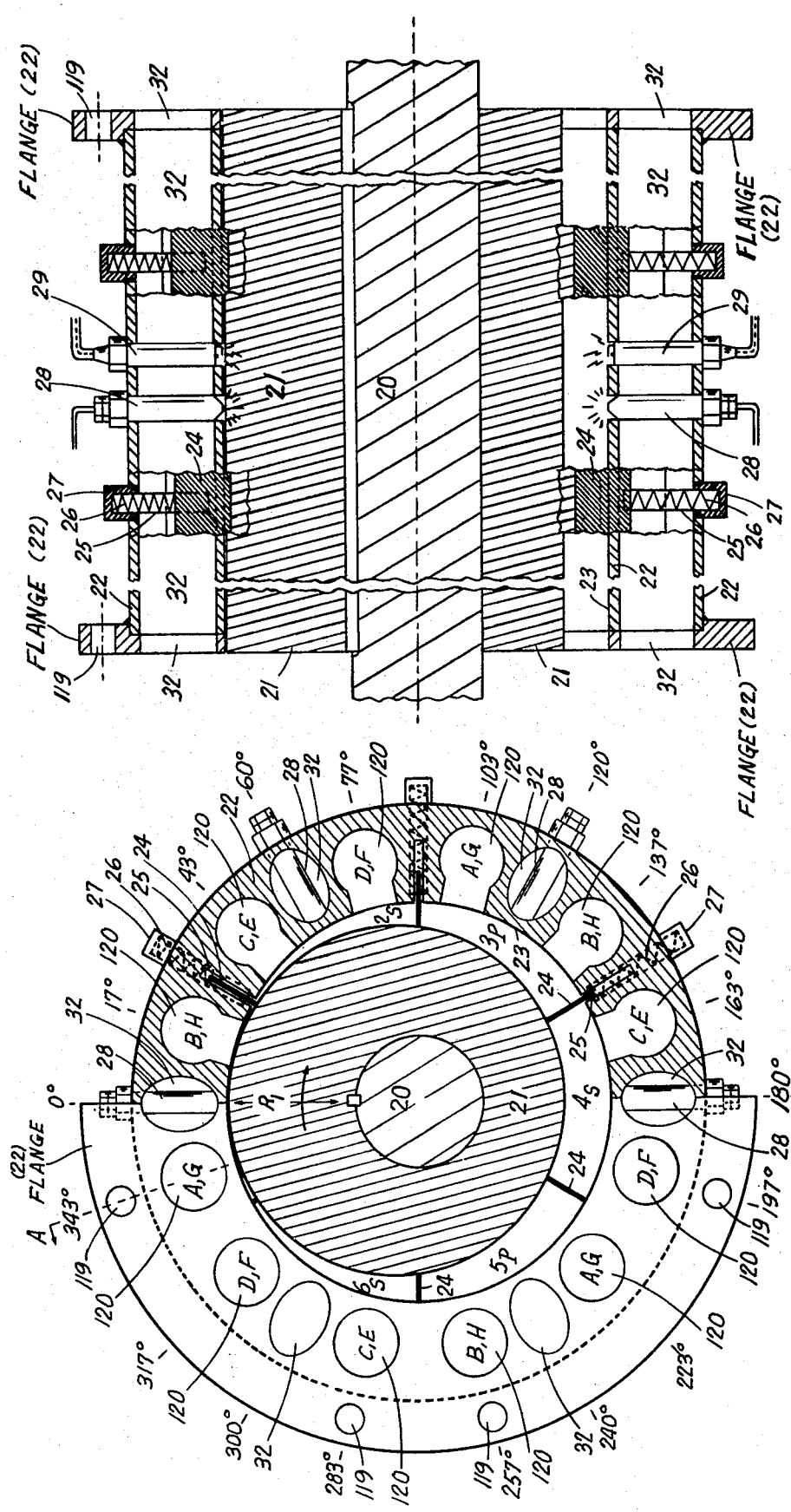

FIGS. 8 and 8A show more details of FIG. 1 and have been described in detail. FIG. 8 is a partial section and FIG. 8A is a full section. Holes 119 are for stud 64. Openings 120 are for the inlet tubes 30 and outlet tubes 31.

Figure 9:
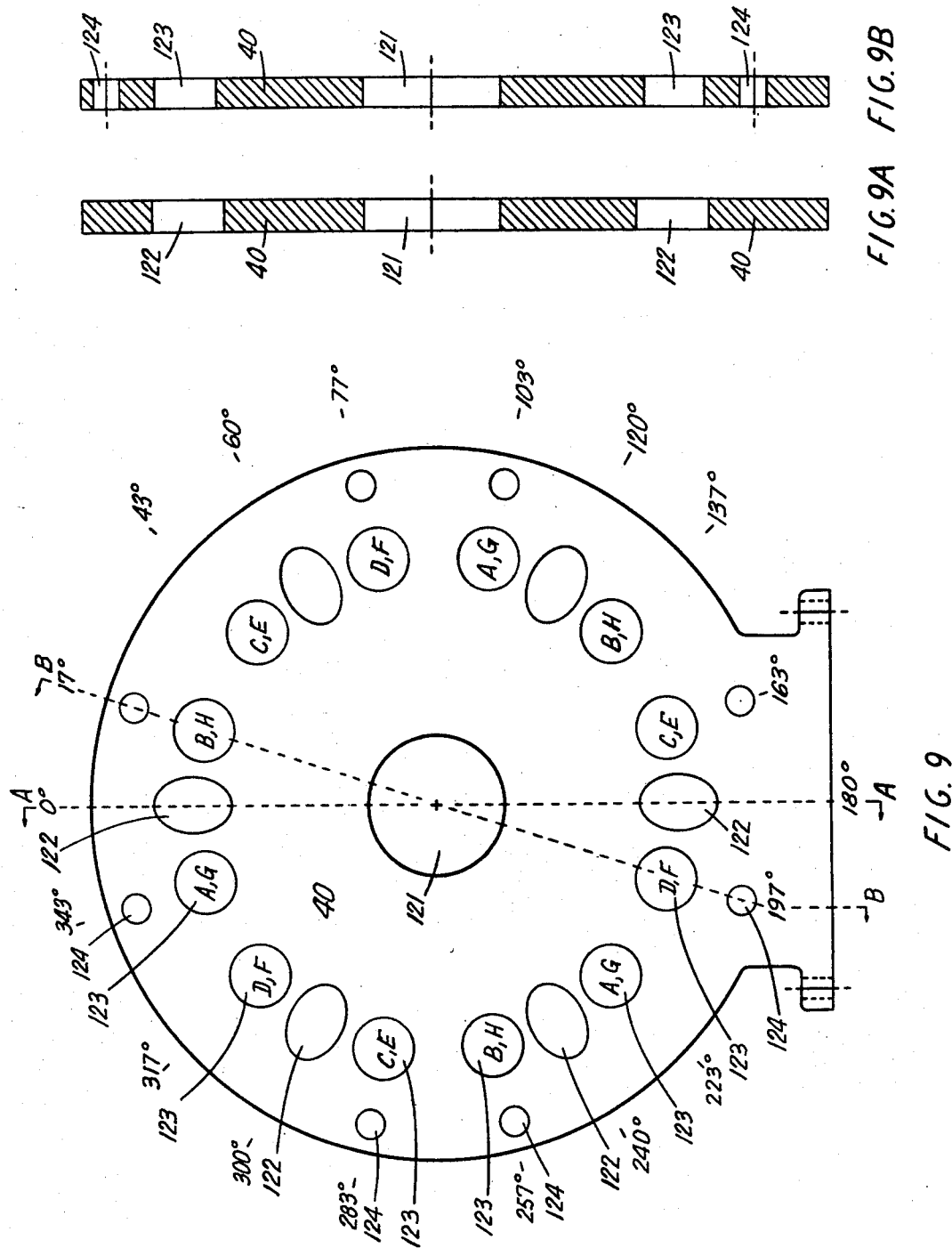

FIG. 9 shows support plate 40 and is essentially a duplicate of FIG. 7 except for the location of the holes. Plate 40a is identical. Included are shaft hole 121 and air inlet holes 122, tube openings 123 and stud holes 124. Mounting holes 125 are for mounting the engine to a surface 200 (FIG. 2).

Figure 10:
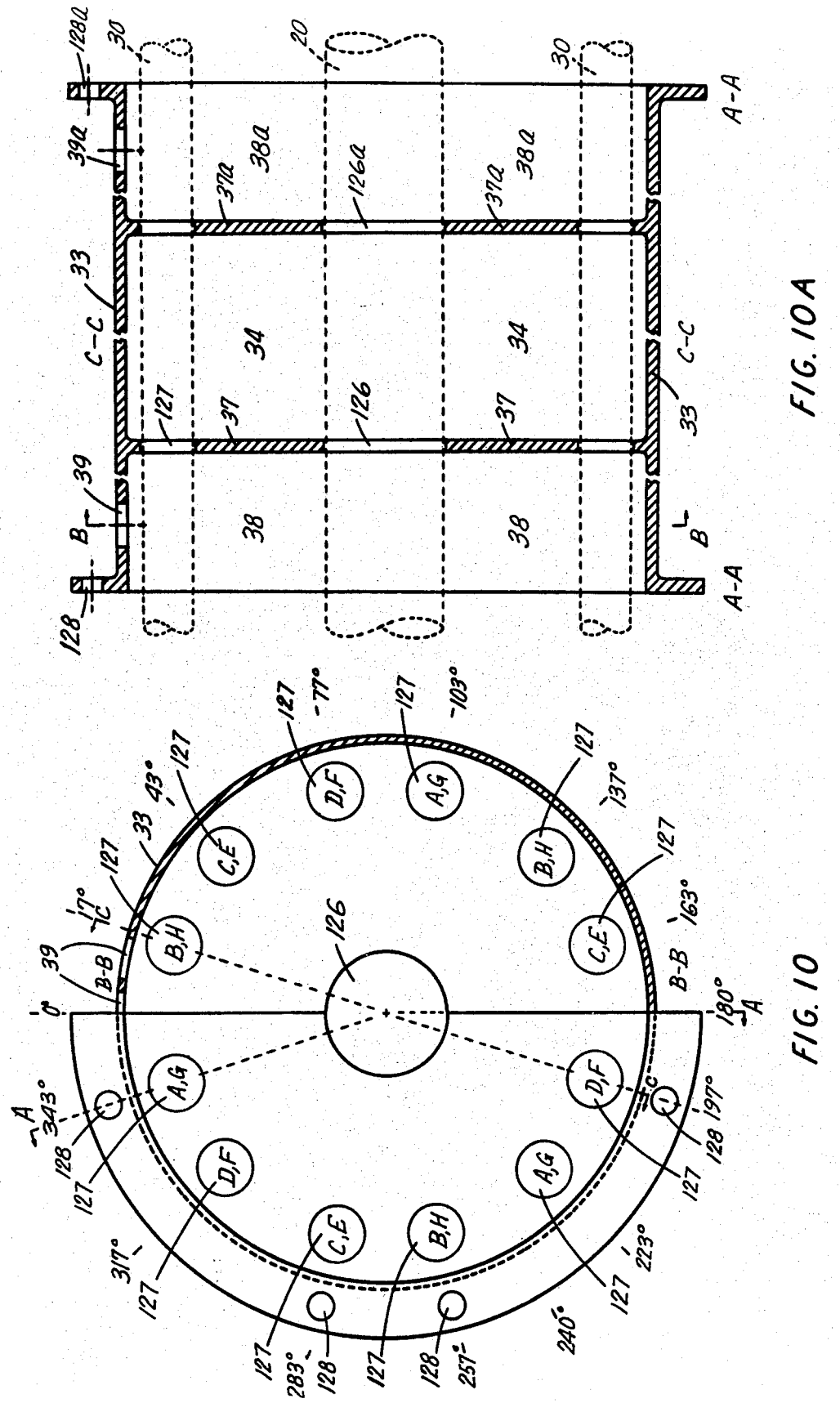

FIGS. 10 and 10A show an opening 126 for shaft 20 and openings 127 for inlet tubes 30 and outlet tubes 31. Openings 128 are for studs 64.

Figure 11:
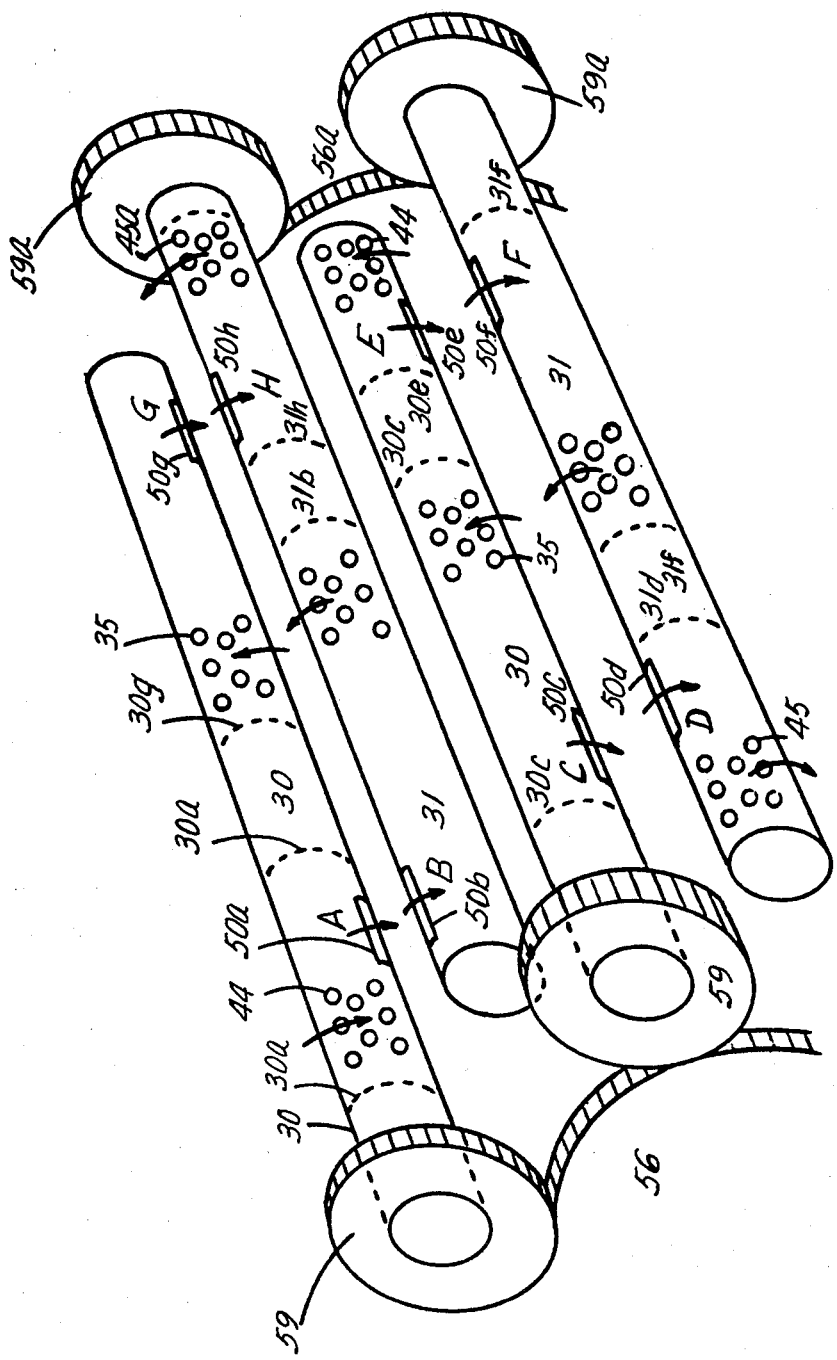

FIG. 11 shows a perspective view of several of the valves separated from the rest of the engine, particularly illustrating the positioning of the sections A to H in tubes 30 and 31 by means of partitions 30a and 31a.

FIGS. 12, 12A, 13, 13A, 13B, 14, 14A, 15, 15A, 15B, 16 and 17 including rotor 21a are essentially the same as corresponding Figures including rotor 21, except that openings 129 in plate 47a are for outlet tubes 31. The reference numerals are the same except for the "a" designation.

OPERATION

The rotary engine of the present invention can be operated as a two stroke or as a four stroke engine. In the two stroke mode, an ignition means 28 adjacent one rotor 21 in one compartment 1 to 6 is actuated simultaneously with an ignition means 28a adjacent the other rotor 21a in one compartment 7 to 12 near the radius of maximum eccentricity $R_1$ and $R_2$ and past a top dead center (TDC) position equally spaced between two abutments 24 and two abutments 24a. In this mode, ignition in all of the compartments 1 to 6 and the compartments 7 to 12 occurs in succession in each 360° rotation of the shaft 20. As shown in FIG. 1, the ignition would take place in compartments 1 and 10 just past TDC then in compartments 2 and 11; compartments 3 and 12; compartments 4 and 7; compartments 5 and 8; and compartments 6 and 9 around the housings 22 and 22a as shown in Table I. The gear sets 51 and 51a are designed to rotate the tubes 30 and 31 360° on each revolution of the shaft 20. The gears 54 and 54a are the same size as gears 59 and 59a to be in a 1:1 ratio rather than in a 1:2 ratio as shown in FIGS. 4 and 16. In this manner, slots 50, 50a, 50b, 50c, 50d, 50e, 50f and 50g are opened to compartments 1 to 12 once on each revolution of the shaft 20 as particularly shown in Table II for compartments 1 to 10.

In operation pressurized air enters openings 39 and 39a to air inlets 38 and 38a where it is heated by heat transfer from walls 37 and 37a. The air passes through air inlet conduits 32 and 32a to openings 44 and 44a in the inlet tubes 30 in manifold 41 and 41a and chambers 42 and 42a. The air passes through the inlet valve tubes 30 sections A and E through slots 50a and 50e into primary compartments P 1, 3 and 5 and 8, 10 and 12 in the proper sequence. Fuel is injected prior to TDC. The rotor 20 rotates and the fuel and air mixture is ignited in primary compartments P. The exhaust gas is removed from the primary compartments P through tubes 31 partitioned sections B and F and slots 50b and 50f of the outlet tubes 31 to chamber 34 in the central housing 33 where it is mixed with pressurized air from opening 36 and inletted through openings 35 to partitioned sections C and G of inlet tubes 30 into the secondary compartments S through slots 50c and 50g as shown in FIGS. 1, 2 and 11. The partitioned sections D and H of the outlet tubes 31 exhaust the gases to chambers 43 and 43a through slots 50d and 50h in the outlet gas manifolds 41 and 41a and the gases are removed through openings 49 and 49a. Thus as can be seen, in the two-stroke cycle mode each of the primary compartments 1, 3 and 5 around rotor 21 and 8, 10 and 12 around rotor 21a are in sequence charged with air and fuel; ignited and exhausted through 360° of rotation of the shaft 20 while each of the secondary compartments 2, 4 and 6 around rotor 21 and compartments 7, 9 and 11 around rotor 21a are completing the same cycle separately.

In the four stroke mode of operation, the shaft 20 completes 720° of rotation and the primary rotor compartments P and secondary rotor compartments S on each rotor 21 or 21a are ignited in sequence in the manner described in may U.S. Pat. No. 3,902,464. Thus air is inletted, mixed with fuel and compressed through one 360° of rotation of the shaft 20 and ignited and exhausted through a second 360° of rotation of the shaft 20 as shown in Table III. The gear sets 51 and 51a are designed to rotate only 180° upon 360° of rotation of the shaft and Table IV shows the sequence of events in compartments 1 and 10. As shown in FIGS. 1, 1A and 2, air is inletted through opening 39 and 39a to inlet chambers 38 and 38a through housing conduits 32 and 32a, through openings 44 and 44a and slots 50 and 50a in sections A and E. The primary and secondary rotor compartments 42 are charged with air, compressed through 180° of rotation of the shaft 20, fuel is injected and then the mixture is ignited and exhausted through a second 180° rotation of the shaft 20. As shown in FIGS. 2A and 11, the slots 50 to 50g on each inlet tube 30 or outlet tube 31 are in a line along the axis of the tube for two cycle operation; however, for four cycle operation the slots 50 to 50g are 180° around the longitudinal axis of the tube 30 or 31 from each other. The slots 50 and 50d for inlet partitioned sections A and C around the rotor 21 are offset to open into compartments 1 to 6 by 60° from each other around the shaft 20. This is the same for slots 50a and 50e of inlet tube 30 partitioned sections E and G. The exhaust tubes 31 have the slots 50b and 50f and 50c and 50g around rotors 21 and 21a positioned in the same manner so that sections B and D adjacent rotor 21 and sections F and H adjacent rotor 21a operate for exhaust removal in succession.

Numerous variations in the basic rotary engine will occur to those skilled in the art. The component parts of the engine can be constructed differently to accomplish the same result. Preferably there are an even number of between 4 and 8 rotor compartments around each rotor.

I claim:

1. A method for generating power from a rotary shaft by providing a rotary internal combustion engine with a rotary shaft defining a longitudinal axis of rotation and mounting dual eccentric rotors spaced apart on the shaft with each rotor mounted in a separate housing and with chamber volume defining means between the rotors and in housings so as to provide multiple variable volume gas compression compartments around each rotor, with valved fuel and rotary tubular air inlet means into and rotary tubular hot exhaust gas outlet means from the compartments adjacent both rotors wherein in succession around each rotor a compressed fuel and air mixture is provided in a compartment and ignited by an ignition means in the compartment to provide the combustion, the improvement which comprises:
   (a) providing multiple primary and multiple secondary compartments around each rotor each with rotary inlet and outlet valve means and with fuel injection means and ignition means;
   (b) supplying hot exhaust gas from exhaust valve means to the primary compartment means through conduit means to secondary compartments through inlet valve means;
   (c) providing a confined space with an air supply means in the conduit means between the primary and secondary compartments for receiving the hot exhaust gas from the primary compartments and for distributing the hot exhaust gases mixed with air to the secondary rotor compartments; and
   (d) igniting a fuel and air mixture in primary and secondary compartments around each rotor with the ignition means in succession wherein the fuel and air mixture in the secondary compartments is diluted with hot exhaust gas so as to provide a fuel, air and hot exhaust gas mixture which can be lean in fuel.

2. In a rotary internal combustion engine with a rotary shaft defining a longitudinal axis of rotation and mounting dual eccentric rotors spaced apart on the shaft with each rotor mounted in a separate housing and with chamber volume defining means between the rotors and the housings so as to provide multiple variable volume gas compression compartments around each rotor, with fuel ignition means and air inlet valve means into and hot exhaust gas outlet valve means from the compartments, wherein in succession around each rotor a compressed fuel and air mixture is ignited by an ignition means in the compartments to provide the internal combustion, the improvement which comprises:
   (a) multiple primary and multiple secondary compartments around each rotor each with rotary inlet and outlet valve means and with fuel injection means and ignition means;
   (b) conduit means for supplying hot exhaust gas from the outlet valve means from the primary compartments through the inlet valve means to the secondary compartments;
   (c) a confined space with an air supply means in the conduit means between the primary and secondary compartments for receiving the hot exhaust gas from the primary compartments and for distributing the hot exhaust gases mixed with air to the secondary rotor compartments, wherein a compressed fuel and air mixture in the primary and the secondary compartments around each rotor is ignited by the ignition means in succession and wherein the fuel and air mixture in the secondary compartments is diluted with hot exhaust gas so as to provide the fuel, air and hot exhaust gas mixture which can be lean in fuel.

3. The engine of claim 2 wherein sliding abutments are provided mounted on the housings as the volume defining means forming the rotor compartments.

4. The engine of claim 2 wherein the confined space is around and concentric with the axis of rotation of the shaft and between the housings.

5. The engine of claim 4 wherein the confined space is adjacent the inlet valve means so as to provide heat transfer to the air inlet means from hot exhaust gas in the confined space.

6. The engine of claim 2 wherein sliding abutments are provided mounted on the housings as the volume defining means forming the compartments, wherein the confined space is between the housings around and concentric with the axis of rotation of the shaft, wherein rotary inlet and outlet valve tubes are the rotary valved air inlet means and the rotary valved outlet means respectively and provide the conduit means between the compartments by means of partitioned sections of the tubes, wherein the tubes are mounted through the housings and have longitudinal axes parallel to the longitudinal axis of the shaft including openings in the tubes into the confined space and with planetary gear means driven by the shaft for separately rotating the inlet and the outlet valve tubes.

7. The engine of claim 6 with air inlets to the inlet valve tubes around and concentric with the axis of rotation of the shaft which are in heat transfer relationship with the confined space and adjacent both housings so as to pre-heat air supplied to the inlet valve tubes.

8. The engine of claim 6 wherein separate air inlet and exhaust gas manifolds are provided in a heat transfer relationship at opposite ends of the housings from the confined space, wherein the manifolds are provided around and concentric with the axis of rotation of the shaft and connected to openings in the valve tubes for air inlet from and hot gas exhaust to the manifolds.

9. The engine of claim 6 wherein the inlet and outlet valve tubes extend between both rotors and have partitioned sections between the rotors so as to provide separate inlet or exhaust valve tubes from a single tube to a compartment around both rotors, wherein the tubes have openings on one side of the partitioned sections for inletting the air into the primary compartments, and for hot gas exhaust to the confined space in the exhaust valve tubes and have openings in the inlet valve tubes from the confined space on the other side of the inlet tube partitioned sections leading to the secondary compartments and then, for hot gas exhaust through the outlet valve tubes.

10. The engine of claim 9 wherein separate air inlet and exhaust gas manifolds are provided in a heat transfer relationship at opposite ends of the housings from the confined space, wherein the manifolds are provided around and concentric with the axis of rotation of the shaft and connected to openings in the valve tubes for air inlet from and hot gas exhaust to the manifolds.

11. The engine of claim 10 wherein air inlets are provided adjacent the confined space concentric with and around the shaft between the housings for both rotors and wherein conduits are provided in the housings to the inlet gas manifolds leading to the inlet tubes for preheating air supplied by the inlet tubes to the primary rotor compartments.

12. In a rotary internal combustion engine operated by igniting a fuel and air mixture in sealed, variable volume compartments in the engine so as to produce rotation of a shaft and then exhausting the ignited gas from the engine including fuel injection means leading into each compartment and an ignition means in each compartment, wherein the engine is of the type which includes the shaft defining a longitudinal axis and with spaced apart bearing surfaces for journaled rotation of the shaft on the axis between two spaced apart sections of the shaft; two spaced apart identically shaped rotors eccentrically mounted on the spaced apart sections of the shaft each having a radius of maximum eccentricity from the longitudinal axis of the shaft such that the radius of maximum eccentricity of one rotor is 180° around the shaft from the same radius of the other rotor; closed housings supporting the shaft mounted around the rotors each with a cylindrically shaped inner surface spaced from the radius of maximum eccentricity of the rotor; multiple resiliently mounted sliding abutments on each of the housings for continuous slidable and sealed contact with the rotors or on the rotors for slideable and sealed contact with the inner surface of the housing through 360° of revolution of the shaft so as to form the sealed variable volume compartments between each of the rotors and housings; two separate sets of planetary gears mounted radially of the shaft outside the housings wherein in each set a central gear is mounted around the shaft and outer planet gears are drivable by inner planet gears which are drivable by the central gear; and multiple rotary inlet valve tubes and multiple outlet valve tubes leading to each compartment, the tubes defining a longitudinal axis and mounted on the housings around the rotors parallel to the longitudinal axis of the shaft with openings in the tubes leading into corresponding openings in the housings leading to the compartments, wherein the outer planet gears are in the form of rings around the tubes and wherein one gear set rotates the inlet valve tubes and the other gear set rotates the outlet valve tubes such that in operation in succession each rotor compartment is provided with a fuel and air mixture, the rotors are rotated by ignition of the fuel and air mixture in the compartment and then the ignited gases are exhausted through the outlet valve tubes, the improvement which comprises:

(a) multiple primary and multiple secondary compartments around each rotor;
(b) inlet and outlet valve tubes each extending to a compartment of both rotors with partitioned sections in each tube so that a single tube is a separate inlet valve tube to compartments of both rotors or a separate outlet valve tube to compartments of both rotors;
(c) inlet and outlet gas manifolds at opposite ends of both of the housings, for common exhaust gas removal from the exhaust valve tubes and for common air inlet into the inlet valve tubes through openings in the tubes leading to one or the other of the gas manifolds;
(d) a confined space between the housings and around and concentric with the axis of the shaft with openings from the inlet and exhaust valve tubes into the confined space and with an air inlet opening into the confined space; and
(e) air inlets on both sides of the confined space, adjacent the housings and around and concentric with the axis of the shaft, wherein in operation the air is introduced through the air inlets to the inlet gas manifolds, is passed through openings in the inlet valve tubes, into primary rotor compartments, compressed and mixed with fuel from the injection means, ignited in the primary rotor compartments by the ignition means, exhausted to the confined space through outlet valve tubes, mixed with air from the inlet opening into the confined space, introduced into inlet valve tubes for secondary rotor compartments, compressed and mixed with fuel from the injection means in a lean fuel and air mixture, ignited by an ignition means in the secondary compartments, exhausted to an exhaust gas manifold through outlet valve tubes by means of the openings in the valve tubes and then vented outside the engine through openings in the exhaust gas manifold.

13. In a rotary engine with fuel inlet and air inlet into and exhaust gas removal valve means from variable volume rotor compartments wherein the engine includes a rotatable shaft defining a longitudinal axis and mounting two spaced apart eccentric rotors on the shaft so that there is a central section between the rotors, wherein each of the rotors are in closed housings, wherein in succession a fuel and air mixture is provided by the fuel and air inlet valve means to the rotor compartments and ignited by ignition means so as to rotate the rotors on the axis and then exhausted by the outlet valve means and wherein the variable volume rotor compartments are formed by sliding abutments between the rotors and the housings, the improvement which comprises:

(a) multiple primary and multiple secondary rotor compartments around each rotor;
(b) adjoining inlet and outlet gas manifolds concentric with the axis of the shaft mounted at opposite ends of the housings furthest from the central section of the shaft for common air inlet to or for common exhaust gas removal from the rotor compartments;

(c) two separate sets of planetary gears each set having axes of rotation parallel to the axis of the shaft and mounted radially around the shaft on opposing ends of the gas manifolds and driven by a central gear on the shaft;

(d) a confined space with an air inlet opening around and concentric with the central section of the shaft and between the housings;

(e) air inlets each with an opening provided between the housings and on both sides of and separate from the confined space and concentric with and around the axis of the shaft in the central section connected to conduit means in the housings leading to the inlet gas manifolds;

(f) multiple rotary inlet tubes as the inlet valve means and outlet tubes as the outlet valve means each having a longitudinal axis mounted around and through both of the housings and around the rotors parallel to the longitudinal axis of the shaft with an outer ring gear from one set of planetary gears around each of the tubes and with openings in the tubes adjacent the rotors leading to openings in the housings for separately supplying air to the rotor compartments and then for removing exhaust gas including partitions dividing each of the tubes into sections as well as openings in the tubes leading into an air inlet or exhaust gas manifolds and openings in the tubes leading into the confined space, wherein in operation air is introduced through the air inlets and heated by heat transfer from the confined space and housings, is passed through the housing into the inlet valve tubes through the openings in air inlet gas manifold, is introduced, compressed, mixed with fuel and ignited in the primary rotor compartments, is exhausted to the confined space through the openings in outlet valve tubes in the confined space and mixed with air, transferred again through the inlet valve tubes to secondary rotor compartments through the openings in the inlet valve tubes in the confined space, compressed, mixed with fuel and ignited in the secondary compartments, exhausted by the outlet valve tubes to the outlet gas manifold by means of openings in the outlet valve tubes to the outlet gas manifold and then is exhausted outside the engine through an opening in the outlet gas manifold.

14. In a rotary engine with fuel injection and swirl means, air inlet into and exhaust gas removal outlet valve means from variable volume rotor compartments wherein the engine includes a rotatable shaft defining a longitudinal axis mounting two spaced apart eccentric rotors on the shaft in two separate closed housings such that in succession a fuel and air mixture is provided by the fuel injection means and air inlet valve means in the variable volume compartments between the rotors and the housings and ignited by igniter means to rotate the rotors on the axis and then exhaust gas is removed by the outlet valve means, the improvement which comprises:

(a) multiple primary and multiple secondary rotor compartments around each rotor;

(b) separate sets of planetary gears mounted radially around the shaft outside each of the housings, wherein in each set outer ring gears with axes of rotation which are on a circle concentric with the shaft axis are driven by a double ring gear concentric with the shaft with outer teeth meshing with teeth on the outer ring gears and with inner teeth which mesh with teeth on a plurality of inner gears mounted on the housing with axes of rotation on a circle concentric with the shaft axis which in turn mesh with teeth on a central gear mounted around the shaft, wherein the outer ring gears are driven through the rotation of the shaft;

(c) multiple rotary inlet valve tubes and multiple outlet valve tubes as the air inlet and outlet valve means each having a longitudinal axis mounted through the housings around both rotors parallel to the longitudinal axis of the shaft with openings in the tubes leading into corresponding openings in the housing each leading to a rotor compartment and with two partitioned sections in the tubes between the rotors, wherein the outer ring gears are mounted around the inlet and outlet valve tubes to rotate the tubes; and (d) a confined space with an air inlet opening mounted between the housings around and concentric with the shaft through which the inlet and exhaust tubes are mounted with openings in the tubes leading to the confined space, wherein in operation air is provided to primary compartments by the inlet valve tubes on one side of the partitioned sections, fuel is provided in the primary compartments by the fuel injection means and mixed with the air which is ignited in the primary rotor compartments is exhausted through openings in the exhaust valve tubes to the confined space and mixed with air and transferred through openings in the inlet valve tubes in the other partitioned sections leading to the secondary rotor compartments, is introduced into the secondary rotor compartments, fuel is provided in the secondary rotor compartments by the fuel injection valve means mixed with the exhaust gas and air, the mixture is ignited in the secondary rotor compartments and then is exhausted through outlet valve tubes, wherein the ignition is in succession around the rotors.

15. The engine of claim 14 wherein there are six inlet valve tubes and six outlet valve tubes and six rotor compartments around both housings.

16. The engine of claim 14 wherein air inlets are provided as part of the valved air inlet means on both sides of the confined space and between the housings such that the exhaust gas in the confined space can heat air in the air inlet by heat transfer, wherein conduit means are provided in the housings for transferring the heated air to inlet gas manifolds around and concentric with the shaft at opposite ends of the housings so as to supply the heated air to the inlet valve tubes.

17. The engine of claim 16 wherein common exhaust gas manifolds are provided adjacent the inlet gas manifolds for exhaust gas removal from openings in the exhaust valve tubes, which exhaust manifolds are around and concentric with the axis of the shaft.

* * * * *